US010769912B2

(12) United States Patent
Roth et al.

(10) Patent No.: US 10,769,912 B2
(45) Date of Patent: Sep. 8, 2020

(54) STREAMING AND STORING AUDIO/VIDEO CONTENT CAPTURED BY AUDIO/VIDEO RECORDING AND COMMUNICATION DEVICES

(71) Applicant: Amazon Technologies, Inc., Seattle, WA (US)

(72) Inventors: Joshua Roth, Pacific Palisades, CA (US); Trevor Phillips, Los Angeles, CA (US); Jason Gluckman, San Diego, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/933,776

(22) Filed: Mar. 23, 2018

(65) Prior Publication Data
US 2018/0276961 A1 Sep. 27, 2018

Related U.S. Application Data

(60) Provisional application No. 62/475,494, filed on Mar. 23, 2017.

(51) Int. Cl.
G08B 13/196 (2006.01)
H04N 7/18 (2006.01)
G08B 3/10 (2006.01)

(52) U.S. Cl.
CPC ......... G08B 13/19669 (2013.01); G08B 3/10 (2013.01); G08B 13/19656 (2013.01);
(Continued)

(58) Field of Classification Search
CPC .............. G08B 25/08; G08B 13/19628; G08B 13/19684; G08B 13/19608;
(Continued)

(56) References Cited

U.S. PATENT DOCUMENTS 4,764,953 A 8/1988 Chern et al.
5,428,388 A 6/1995 von Bauer et al.
(Continued)

FOREIGN PATENT DOCUMENTS

CN 2585521 Y 11/2003
CN 2792061 Y 6/2006
(Continued)

Primary Examiner — Anthony Bantamoi
(74) Attorney, Agent, or Firm — Greenberg Traurig, LLP

(57) ABSTRACT

Streaming and storing content captured by audio/video (A/V) recording and communication devices in accordance with various embodiments of the present disclosure are provided. In one embodiment, a method for transmitting and storing video images captured by an A/V recording and communication device including a camera and memory is provided, the method comprising: capturing video images of a field of view of the camera; detecting a person at the A/V recording and communication device; in response to detecting the person, storing a high-quality version of the video images at the memory of the A/V recording and communication device; determining an available network bit rate for video streaming; if the available network bit rate is above a threshold, then transmitting a high-quality video stream to a client device; and if the available network bit rate is below the threshold, then transmitting a low-quality video stream to the client device.

19 Claims, 18 Drawing Sheets

(52) U.S. Cl.
CPC ....... *G08B 13/19658* (2013.01); *H04N 7/186* (2013.01); *H04N 7/188* (2013.01); *G08B 13/19667* (2013.01)

(58) Field of Classification Search
CPC ................ G08B 13/19669; G08B 3/10; G08B 13/19656; G08B 13/19658; G08B 13/19667; G06K 9/00671; H04N 7/188; H04N 7/186
See application file for complete search history.

(56) References Cited

U.S. PATENT DOCUMENTS

| | | |
|---|---|---|
| 5,760,848 A | 6/1998 | Cho |
| 6,072,402 A | 6/2000 | Kniffin et al. |
| 6,192,257 B1 | 2/2001 | Ray |
| 6,271,752 B1 | 8/2001 | Vaios |
| 6,429,893 B1 | 8/2002 | Xin |
| 6,456,322 B1 | 9/2002 | Marinacci |
| 6,476,858 B1 | 11/2002 | Ramirez Diaz et al. |
| 6,633,231 B1 | 10/2003 | Okamoto et al. |
| 6,658,091 B1 | 12/2003 | Naidoo et al. |
| 6,753,774 B2 | 6/2004 | Pan et al. |
| 6,970,183 B1 | 11/2005 | Monroe |
| 7,062,291 B2 | 6/2006 | Ryley et al. |
| 7,065,196 B2 | 6/2006 | Lee |
| 7,085,361 B2 | 8/2006 | Thomas |
| 7,109,860 B2 | 9/2006 | Wang |
| 7,193,644 B2 | 3/2007 | Carter |
| 7,304,572 B2 | 12/2007 | Sheynman et al. |
| 7,382,249 B2 | 6/2008 | Fancella |
| 7,450,638 B2 | 11/2008 | Iwamura |
| 7,643,056 B2 | 1/2010 | Silsby |
| 7,683,924 B2 | 3/2010 | Oh et al. |
| 7,683,929 B2 | 3/2010 | Elazar et al. |
| 7,738,917 B2 | 6/2010 | Ryley et al. |
| 8,139,098 B2 | 3/2012 | Carter |
| 8,144,183 B2 | 3/2012 | Carter |
| 8,154,581 B2 | 4/2012 | Carter |
| 8,619,136 B2 | 12/2013 | Howarter et al. |
| 8,872,915 B1 | 5/2014 | Scalisi et al. |
| 8,780,201 B1 | 7/2014 | Scalisi et al. |
| 8,823,795 B1 | 9/2014 | Scalisi et al. |
| 8,842,180 B1 | 9/2014 | Kasmir et al. |
| 8,937,659 B1 | 1/2015 | Scalisi et al. |
| 8,941,736 B1 | 1/2015 | Scalisi |
| 8,947,530 B1 | 2/2015 | Scalisi |
| 8,953,040 B1 | 2/2015 | Scalisi et al. |
| 9,013,575 B2 | 4/2015 | Scalisi |
| 9,049,352 B2 | 6/2015 | Scalisi et al. |
| 9,053,622 B2 | 6/2015 | Scalisi |
| 9,058,738 B1 | 6/2015 | Scalisi |
| 9,060,103 B2 | 6/2015 | Scalisi |
| 9,060,104 B2 | 6/2015 | Scalisi |
| 9,065,987 B2 | 6/2015 | Scalisi |
| 9,094,584 B2 | 7/2015 | Scalisi et al. |
| 9,113,051 B1 | 8/2015 | Scalisi |
| 9,113,052 B1 | 8/2015 | Scalisi et al. |
| 9,118,819 B1 | 8/2015 | Scalisi et al. |
| 9,142,214 B2 | 9/2015 | Scalisi |
| 9,160,987 B1 | 10/2015 | Kasmir et al. |
| 9,165,444 B2 | 10/2015 | Scalisi |
| 9,172,920 B1 | 10/2015 | Kasmir et al. |
| 9,172,921 B1 | 10/2015 | Scalisi et al. |
| 9,172,922 B1 | 10/2015 | Kasmir et al. |
| 9,179,107 B1 | 11/2015 | Scalisi |
| 9,179,108 B1 | 11/2015 | Scalisi |
| 9,179,109 B1 | 11/2015 | Kasmir et al. |
| 9,196,133 B2 | 11/2015 | Scalisi et al. |
| 9,197,867 B1 | 11/2015 | Scalisi et al. |
| 9,230,424 B1 | 1/2016 | Scalisi et al. |
| 9,237,318 B2 | 1/2016 | Kasmir et al. |
| 9,247,219 B2 | 1/2016 | Kasmir et al. |
| 9,253,455 B1 | 2/2016 | Harrison et al. |
| 9,342,936 B2 | 5/2016 | Scalisi |
| 9,508,239 B1 | 11/2016 | Harrison et al. |
| 9,736,284 B2 | 8/2017 | Scalisi et al. |
| 9,743,049 B2 | 8/2017 | Scalisi et al. |
| 9,769,435 B2 | 9/2017 | Scalisi et al. |
| 9,786,133 B2 | 10/2017 | Harrison et al. |
| 9,799,183 B2 | 10/2017 | Harrison et al. |
| 2002/0094111 A1 | 7/2002 | Puchek et al. |
| 2002/0147982 A1 | 10/2002 | Naidoo et al. |
| 2003/0043047 A1 | 3/2003 | Braun |
| 2004/0085205 A1 | 5/2004 | Yeh |
| 2004/0085450 A1 | 5/2004 | Stuart |
| 2004/0086093 A1 | 5/2004 | Schranz |
| 2004/0095254 A1 | 5/2004 | Maruszczak |
| 2004/0135686 A1 | 7/2004 | Parker |
| 2005/0111660 A1 | 5/2005 | Hosoda |
| 2006/0010199 A1 | 1/2006 | Brailean et al. |
| 2006/0022816 A1 | 2/2006 | Yukawa |
| 2006/0139449 A1 | 6/2006 | Cheng et al. |
| 2006/0156361 A1 | 7/2006 | Wang et al. |
| 2007/0008081 A1 | 1/2007 | Tylicki et al. |
| 2010/0225455 A1 | 9/2010 | Claiborne et al. |
| 2011/0102588 A1* | 5/2011 | Trundle .................. H04N 7/18 |
| 2012/0281115 A1* | 11/2012 | Kouncar ................ H04N 5/225 |
| 2013/0057695 A1* | 3/2013 | Huisking ................ H04N 7/18 |
| 2014/0267716 A1 | 9/2014 | Child et al. |
| 2015/0163463 A1 | 6/2015 | Hwang et al. |
| 2016/0173825 A1* | 6/2016 | Polyakov ............... H04N 7/155 |
| 2016/0180667 A1* | 6/2016 | Bunker ............ G08B 13/19613 |

FOREIGN PATENT DOCUMENTS

| | | |
|---|---|---|
| EP | 0944883 A1 | 6/1998 |
| EP | 1480462 A1 | 11/2004 |
| GB | 2286283 A | 8/1995 |
| GB | 2354394 A | 3/2001 |
| GB | 2357387 A | 6/2001 |
| GB | 2400958 A | 10/2004 |
| JP | 2001-103463 A | 4/2001 |
| JP | 2002-033839 A | 1/2002 |
| JP | 2002-125059 A | 4/2002 |
| JP | 2002-342863 A | 11/2002 |
| JP | 2002-344640 A | 11/2002 |
| JP | 2002-354137 A | 12/2002 |
| JP | 2002-368890 A | 12/2002 |
| JP | 2003-283696 A | 10/2003 |
| JP | 2004-128835 A | 4/2004 |
| JP | 2005-341040 A | 12/2005 |
| JP | 2006-147650 A | 6/2006 |
| JP | 2006-262342 A | 9/2006 |
| JP | 2009-008925 A | 1/2009 |
| WO | 1998/39894 A1 | 9/1998 |
| WO | 2001/13638 A1 | 2/2001 |
| WO | 2001/93220 A1 | 12/2001 |
| WO | 2002/085019 A1 | 10/2002 |
| WO | 2003/028375 A1 | 4/2003 |
| WO | 2003/096696 A1 | 11/2003 |
| WO | 2006/038760 A1 | 4/2006 |
| WO | 2006/067782 A1 | 6/2006 |
| WO | 2007/125143 A1 | 8/2007 |

\* cited by examiner

STREAMING AND STORING AUDIO/VIDEO CONTENT CAPTURED BY AUDIO/VIDEO RECORDING AND COMMUNICATION DEVICES

CROSS-REFERENCE TO RELATED APPLICATION

This application claims priority to provisional application Ser. No. 62/475,494, filed on Mar. 23, 2017, the entire contents of which are hereby incorporated by reference.

TECHNICAL FIELD

The present embodiments relate to audio/video (A/V) recording and communication devices, including A/V recording and communication doorbells. In particular, the present embodiments relate to improvements in the functionality of A/V recording and communication devices that strengthen the ability of such devices to reduce crime and enhance public safety.

BACKGROUND

Home safety is a concern for many homeowners and renters. Those seeking to protect or monitor their homes often wish to have video and audio communications with visitors, for example, those visiting an external door or entryway. Audio/Video (A/V) recording and communication devices, such as doorbells, provide this functionality, and can also aid in crime detection and prevention. For example, audio and/or video captured by an A/V recording and communication device can be uploaded to the cloud and recorded on a remote server. Subsequent review of the A/V footage can aid law enforcement in capturing perpetrators of home burglaries and other crimes. Further, the presence of one or more A/V recording and communication devices on the exterior of a home, such as a doorbell unit at the entrance to the home, acts as a powerful deterrent against would-be burglars.

SUMMARY

The present embodiments have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

One aspect of the present embodiments includes the realization that current techniques for recording A/V footage with A/V recording and communication devices frequently do not capture high-quality A/V footage because of limitations in available streaming bandwidth at the time the A/V footage is captured, and/or because of lost packets in the data stream. The present embodiments solve this problem by decoupling the streaming A/V signal from the recorded A/V signal, and uploading the video footage from the recorded A/V signal after the call between the A/V recording and communication device and the user's client device has terminated.

In a first aspect, a method for transmitting and storing video images captured by an audio/video (A/V) recording and communication device is provided, the A/V recording and communication device including a camera and memory, the method comprising the camera of the A/V recording and communication device capturing video images of a field of view of the camera, the A/V recording and communication device detecting a person at the A/V recording and communication device, in response to detecting the person at the A/V recording and communication device, storing a high-quality version of the video images at the memory of the A/V recording and communication device in a first video signal, determining an available network bit rate for video streaming, if the available network bit rate for video streaming is above a threshold, then transmitting a high-quality video stream to a client device in a second video signal, and if the available network bit rate for video streaming is below the threshold, then transmitting a low-quality video stream to the client device in the second video signal.

An embodiment of the first aspect further comprises, before detecting the person at the A/V recording and communication device, buffering the video images captured by the camera of the A/V recording and communication device.

Another embodiment of the first aspect further comprises uploading the stored high-quality version of the video images to a remote storage device.

In another embodiment of the first aspect, the detecting the person at the A/V recording and communication device comprises detecting motion within the field of view of the camera.

In another embodiment of the first aspect, the A/V recording and communication device comprises a doorbell having a button.

In another embodiment of the first aspect, detecting the person at the A/V recording and communication device comprises detecting that the button has been pressed.

In another embodiment of the first aspect, the A/V recording and communication device further comprises a microphone.

Another embodiment of the first aspect further comprises, in response to detecting the person at the A/V recording and communication device, capturing audio from the person and storing the audio at the memory of the A/V recording and communication device.

Another embodiment of the first aspect further comprises uploading the stored audio to a remote storage device.

In another embodiment of the first aspect, the high-quality version of the video images comprises a high framerate, a high bitrate, and/or a high image resolution.

In a second aspect, an audio/video (A/V) recording and communication device configured to be located near an entrance to a structure is provided, the A/V recording and communication device comprising a camera, a processor, and a memory, wherein the memory stores code operable by the processor for detecting a person at the A/V recording and communication device, the camera capturing video images of the person at the A/V recording and communication device, determining an available network bit rate for video streaming, if the available network bit rate for video streaming is above a threshold, then transmitting a high-quality version of the video images to a client device in a second video signal, and storing the high-quality version of the video images at the memory of the A/V recording and communication device in a first video signal, and if the available network bit rate for video streaming is below the threshold, then transmitting a low-quality version of the video images to the client device in the second video signal, and storing the high-quality version of the video images at the memory of the A/V recording and communication device in the first video signal.

In an embodiment of the second aspect, the code is further operable by the processor for, before detecting the person at the A/V recording and communication device, buffering the video images captured by the camera of the A/V recording and communication device.

In another embodiment of the second aspect, the code is further operable by the processor for uploading the stored high-quality version of the video images to a remote storage device.

In another embodiment of the second aspect, detecting the person at the A/V recording and communication device comprises detecting motion within the field of view of the camera.

In another embodiment of the second aspect, the A/V recording and communication device comprises a doorbell having a button.

In another embodiment of the second aspect, detecting the person at the A/V recording and communication device comprises detecting that the button has been pressed.

In another embodiment of the second aspect, the A/V recording and communication device further comprises a microphone.

In another embodiment of the second aspect, the code is further operable by the processor for, in response to detecting the person at the A/V recording and communication device, capturing audio from the person and storing the audio at the memory of the A/V recording and communication device.

In another embodiment of the second aspect, the code is further operable by the processor for uploading the stored audio to a remote storage device.

In another embodiment of the second aspect, the high-quality version of the video images comprises a high framerate, a high bitrate, and/or a high image resolution.

BRIEF DESCRIPTION OF THE DRAWINGS

The present embodiments now will be discussed in detail with an emphasis on highlighting the advantageous features. These embodiments depict the novel and non-obvious apparatus, systems, and methods for streaming and storing audio and video content captured by an A/V recording and communication device shown in the accompanying drawings, which are for illustrative purposes only. These drawings include the following figures, in which like numerals indicate like parts.

DETAILED DESCRIPTION

Figure 1A:
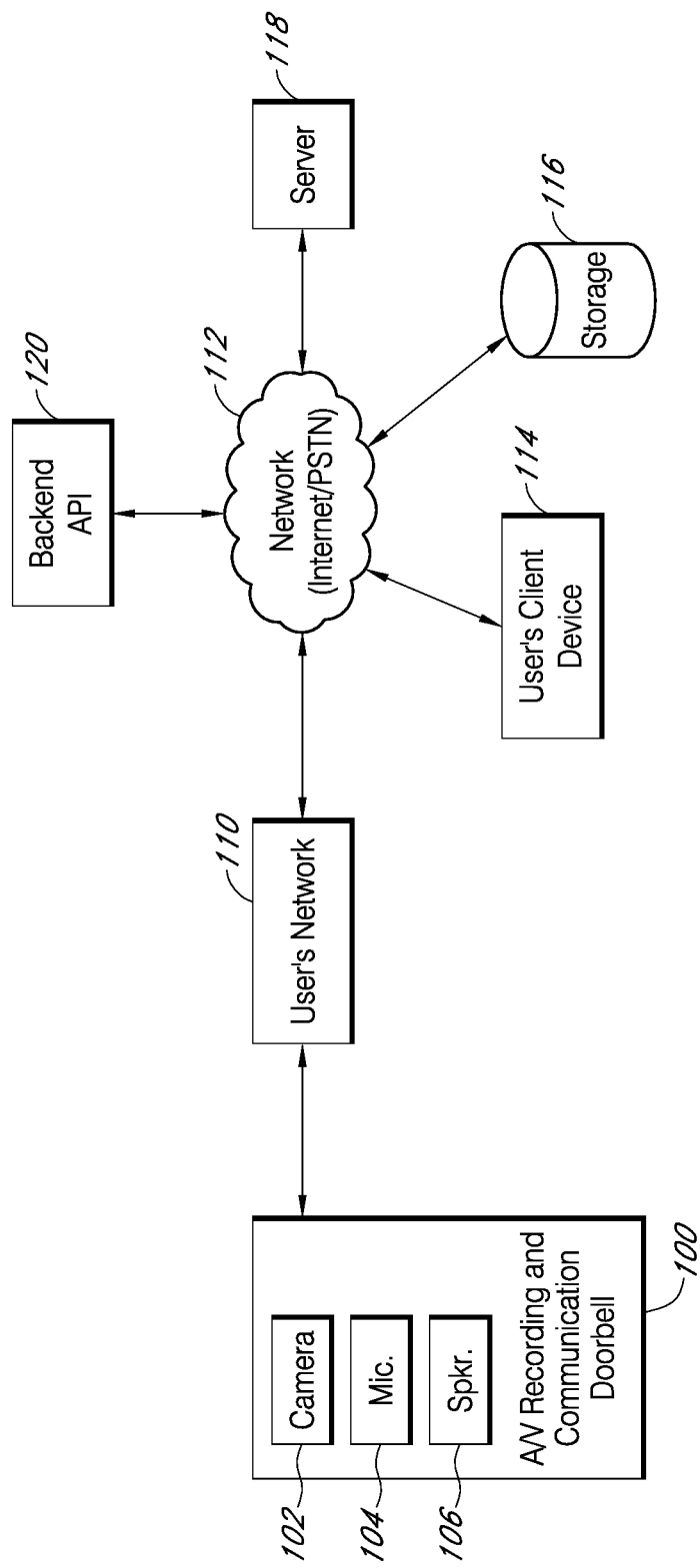
FIG. 1A is a functional block diagram illustrating a system for streaming and storing audio/video content captured by an A/V recording and communication device.

The following detailed description describes the present embodiments with reference to the drawings. In the drawings, reference numbers label elements of the present embodiments. These reference numbers are reproduced below in connection with the discussion of the corresponding drawing features.

With reference to FIG. 1A, the present embodiments include an audio/video (A/V) recording and communication doorbell 100. While the present disclosure provides numerous examples of methods and systems including A/V recording and communication doorbells, the present embodiments are equally applicable for A/V recording and communication devices other than doorbells. For example, the present embodiments may include one or more A/V recording and communication security cameras instead of, or in addition to, one or more A/V recording and communication doorbells. An example A/V recording and communication security camera may include substantially all of the structure and functionality of the doorbells described herein, but without the front button and related components.

The A/V recording and communication doorbell 100 is typically located near the entrance to a structure (not shown), such as a dwelling, a business, a storage facility, etc., or in any other location. The A/V recording and communication doorbell 100 includes a camera 102, a microphone 104, and a speaker 106. The camera 102 may comprise, for example, a high definition (HD) video camera, such as one capable of capturing video images at an image display resolution of 1080p or better. While not shown, the A/V recording and communication doorbell 100 may also include other hardware and/or components, such as a housing, one or more motion sensors (and/or other types of sensors), a button, etc. The A/V recording and communication doorbell 100 may further include similar componentry and/or functionality as the wireless communication doorbells described in any of US Patent Application Publication Nos. 2015/0022620 (application Ser. No. 14/499,828), 2015/0022618 (application Ser. No. 14/334,922), Application Ser. No. 62/308,746, filed on Mar. 15, 2016 and entitled Low-Power-Consumption Audio/Video Recording and Communication Doorbell, application Ser. No. 15/459,076, filed on Mar. 15, 2017 and entitled Low-Power-Consumption Audio/Video Recording and Communication Doorbell, and application Ser. No. 15/459,087, filed on Mar. 15, 2017 and entitled Low-Power-Consumption Audio/Video Recording and Communication Doorbell. All of these prior applications are incorporated herein by reference in their entireties as if fully set forth.

With further reference to FIG. 1A, the A/V recording and communication doorbell 100 communicates with a user's network 110, which may be, for example, a wired and/or wireless network. If the user's network 110 is wireless, or includes a wireless component, the network 110 may be a Wi-Fi network compatible with the IEEE 802.11 standard and/or other wireless communication standard(s). The user's network 110 is connected to another network 112, which may comprise, for example, the Internet and/or a public switched telephone network (PSTN). As described below, the A/V recording and communication doorbell 100 may communicate with the user's client device 114 via the user's network 110 and the network 112 (Internet/PSTN). The user's client device 114 may comprise, for example, a mobile telephone (may also be referred to as a cellular telephone), such as a smartphone, a personal digital assistant (PDA), or another communication device. The user's client device 114 comprises a display (not shown) and related components capable of displaying streaming and/or recorded video images. The user's client device 114 may also comprise a speaker and related components capable of broadcasting streaming and/or recorded audio, and may also comprise a microphone. The A/V recording and communication doorbell 100 may also communicate with one or more remote storage device(s) 116 (may be referred to interchangeably as "cloud storage device(s)"), one or more servers 118, and/or a backend API (application programming interface) 120 via the user's network 110 and the network 112 (Internet/PSTN). In some embodiments, the server 118 may comprise an application server. While FIG. 1 illustrates the storage device 116, the server 118, and the backend API 120 as components separate from the network 112, it is to be understood that the storage device 116, the server 118, and/or the backend API 120 may be considered to be components of the network 112.

In one or more embodiments, the application server 118 may comprise a backend API including one or more components. A backend API (application programming interface) may comprise, for example, a server (e.g. a real server, or a virtual machine, or a machine running in a cloud infrastructure as a service), or multiple servers networked together, exposing at least one API to client(s) accessing it. These servers may include components such as application servers (e.g. software servers), depending upon what other components are included, such as a caching layer, or database layers, or other components. A backend API may, for example, comprise many such applications, each of which communicate with one another using their public APIs. In some embodiments, the API backend may hold the bulk of the user data and offer the user management capabilities, leaving the clients to have very limited state.

The network 112 may be any wireless network or any wired network, or a combination thereof, configured to operatively couple the above mentioned modules, devices, and systems as shown in FIG. 1. For example, the network 112 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE, Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, GPS, CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-1394 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

According to one or more aspects of the present embodiments, when a person (may be referred to interchangeably as "visitor") arrives at the A/V recording and communication doorbell 100, the A/V recording and communication doorbell 100 detects the visitor's presence and begins capturing video images within a field of view of the camera 102. The A/V recording and communication doorbell 100 may also capture audio through the microphone 104. The A/V recording and communication doorbell 100 may detect the visitor's presence using a motion sensor, and/or by detecting that the visitor has pressed the button on the A/V recording and communication doorbell 100.

In response to the detection of the visitor, the A/V recording and communication doorbell 100 sends an alert to the user's client device 114 (FIG. 1A) via the user's network 110 and the network 112. The A/V recording and communication doorbell 100 also sends streaming video, and may also send streaming audio, to the user's client device 114. If the user answers the alert, two-way audio communication may then occur between the visitor and the user through the A/V recording and communication doorbell 100 and the user's client device 114. The user may view the visitor throughout the duration of the call, but the visitor cannot see the user (unless the A/V recording and communication doorbell 100 includes a display, which it may in some embodiments).

The video images captured by the camera 102 of the A/V recording and communication doorbell 100 (and the audio captured by the microphone 104) may be uploaded to the cloud and recorded on the remote storage device 116 (FIG. 1A). In some embodiments, the video and/or audio may be recorded on the remote storage device 116 even if the user chooses to ignore the alert sent to his or her client device 114.

With further reference to FIG. 1, the system may further comprise a backend API 120 including one or more components. A backend API (application programming interface) may comprise, for example, a server (e.g. a real server, or a virtual machine, or a machine running in a cloud infrastructure as a service), or multiple servers networked together, exposing at least one API to client(s) accessing it. These servers may include components such as application servers (e.g. software servers), depending upon what other components are included, such as a caching layer, or database layers, or other components. A backend API may, for example, comprise many such applications, each of which communicate with one another using their public APIs. In some embodiments, the API backend may hold the bulk of the user data and offer the user management capabilities, leaving the clients to have a very limited state.

The backend API 120 illustrated in FIG. 1 may include one or more APIs. An API is a set of routines, protocols, and tools for building software and applications. An API expresses a software component in terms of its operations, inputs, outputs, and underlying types, and defines functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and it provides facilities to develop applications for that system using a given programming language. In addition to accessing databases or computer hardware like hard disk drives or video cards, an API can ease the work of programming GUI components. For example, an API can facilitate integration of new features into existing applications (a so-called "plug-in API"). An API can also assist otherwise distinct applications with sharing data, which can help to integrate and enhance the functionalities of the applications.

The backend API 120 illustrated in FIG. 1 may further include one or more services (also referred to as network services). A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components can both be run on the same machine. Clients and servers may have a user interface, and sometimes other hardware associated with them.

Figure 1B:
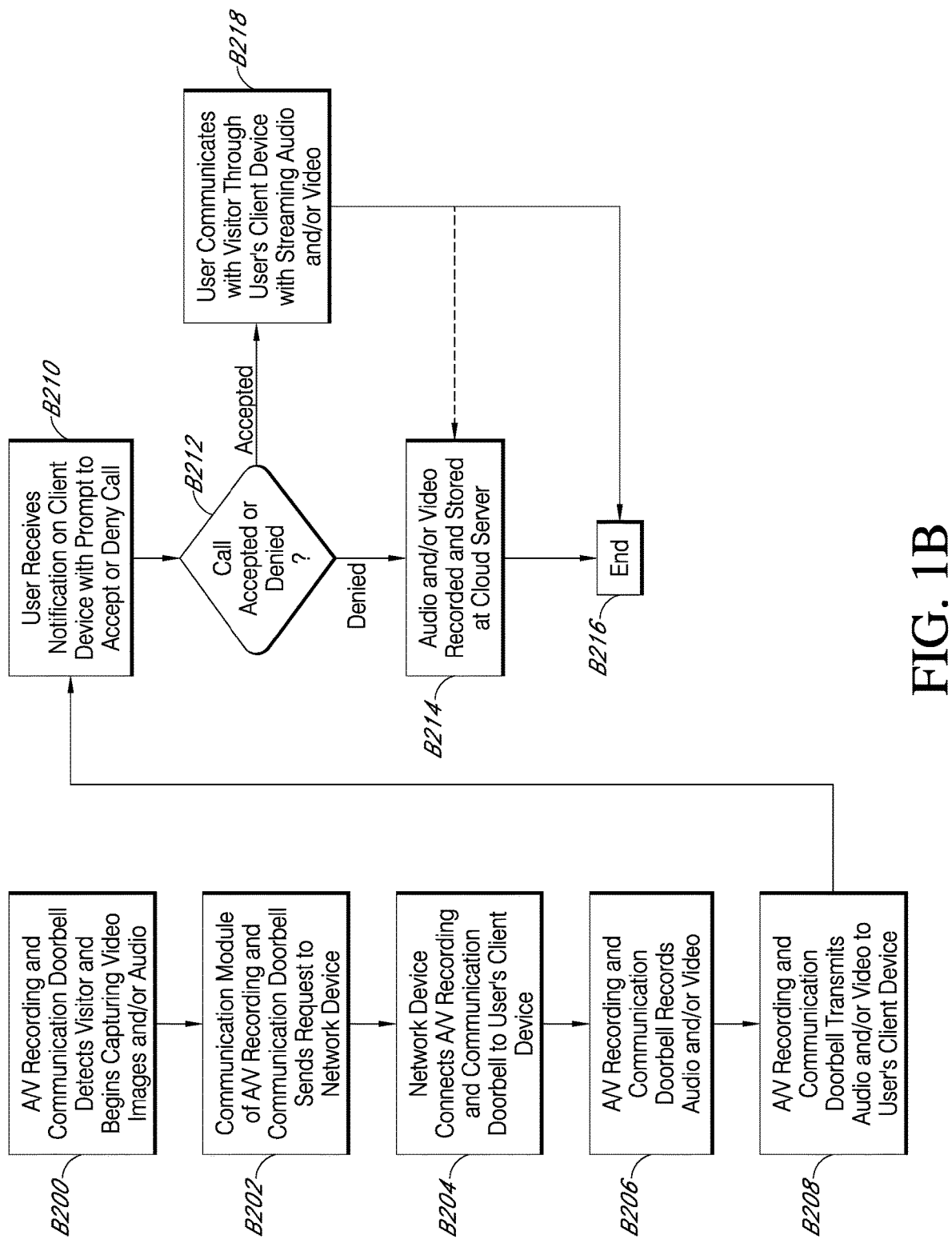
FIG. 1B is a flowchart illustrating a process for streaming and storing A/V content from an A/V recording and communication doorbell system.

FIG. 1B is a flowchart illustrating a process for streaming and storing A/V content from an A/V recording and communication doorbell system, such as the system illustrated in FIG. 1A. At block B200, the A/V recording and communication doorbell 100 detects the visitor's presence and begins capturing video images within a field of view of the camera 102. The A/V recording and communication doorbell 100 may also capture audio through the microphone 104. As described above, the A/V recording and communication doorbell 100 may detect the visitor's presence by detecting motion using the camera 102 and/or a motion sensor, and/or by detecting that the visitor has pressed the button on the A/V recording and communication doorbell 100.

At block B202, a communication module of the A/V recording and communication doorbell 100 sends a request, via the user's network 110 and the network 112, to a device in the network 112. For example, the network device to which the request is sent may be an application server, such as the application server 118. The application server 118 may comprise a computer program and/or a machine that waits for requests from other machines or software (clients) and responds to them. A server typically processes data. One purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

In response to the request, at block B204 the network device may connect the A/V recording and communication doorbell 100 to the user's client device 114 through the user's network 110 and the network 112. At block B206, the A/V recording and communication doorbell 100 may record available audio and/or video data using the camera 102, the microphone 104, and/or any other sensor available. At block B208, the audio and/or video data is transmitted (streamed) from the A/V recording and communication doorbell 100 to the user's client device 114 via the user's network 110 and the network 112. At block B210, the user may receive a notification on his or her client device 114 with a prompt to either accept or deny the call.

At block B212, the process determines whether the user has accepted or denied the call. If the user denies the notification, then the process advances to block B214, where the audio and/or video data is recorded and stored at a cloud server. The session then ends at block B216 and the connection between the A/V recording and communication doorbell 100 and the user's client device 114 is terminated. If, however, the user accepts the notification, then at block B218 the user communicates with the visitor through the user's client device 114 while audio and/or video data captured by the camera 102, the microphone 104, and/or other sensors is streamed to the user's client device 114. At the end of the call, the user may terminate the connection between the user's client device 114 and the A/V recording and communication doorbell 100 and the session ends at block B216. In some embodiments, the audio and/or video data may be recorded and stored at a cloud server (block B214) even if the user accepts the notification and communicates with the visitor through the user's client device 114.

In A/V recording and communication doorbell systems other than the present embodiments, the quality of the video and/or audio recorded on the remote storage device may be negatively impacted by a low network bit rate for the video stream that is transmitted to the user's client device. For example, during the transmission of the streaming video from the A/V recording and communication doorbell to the user's client device, if the available network bit rate is relatively low, then the video quality must be reduced to provide a usable video stream to the user's client device. Then, because the video that is stored at the remote storage device is the same as the video that is streamed to the user's client device, if the quality of the streaming video is low, so too is the quality of the stored video. The present embodiments overcome this problem by decoupling the streaming video signal, which is sent to the user's client device, from the stored video signal, which is stored at a local memory of the A/V recording and communication device and later uploaded to the cloud (the remote storage device). The stored video signal is thus high-quality, regardless of the available network bit rate at the time the streaming video signal is sent to the user's client device. When the locally stored high-quality video is later uploaded to the remote storage device, its high-quality can be preserved, regardless of the available network bit rate at the time of upload, because it doesn't matter how much time is required to complete the upload. The present embodiments thus consistently provide high-quality uploaded video footage that can be preserved for later viewing, such as by law enforcement to aid in the identification of criminals, which can lead to lower crime rates and safer neighborhoods. The high-quality uploaded video footage may include a high framerate, a high bitrate, and/or a high image resolution (such as 720p or 1080p or better).

Figure 2:
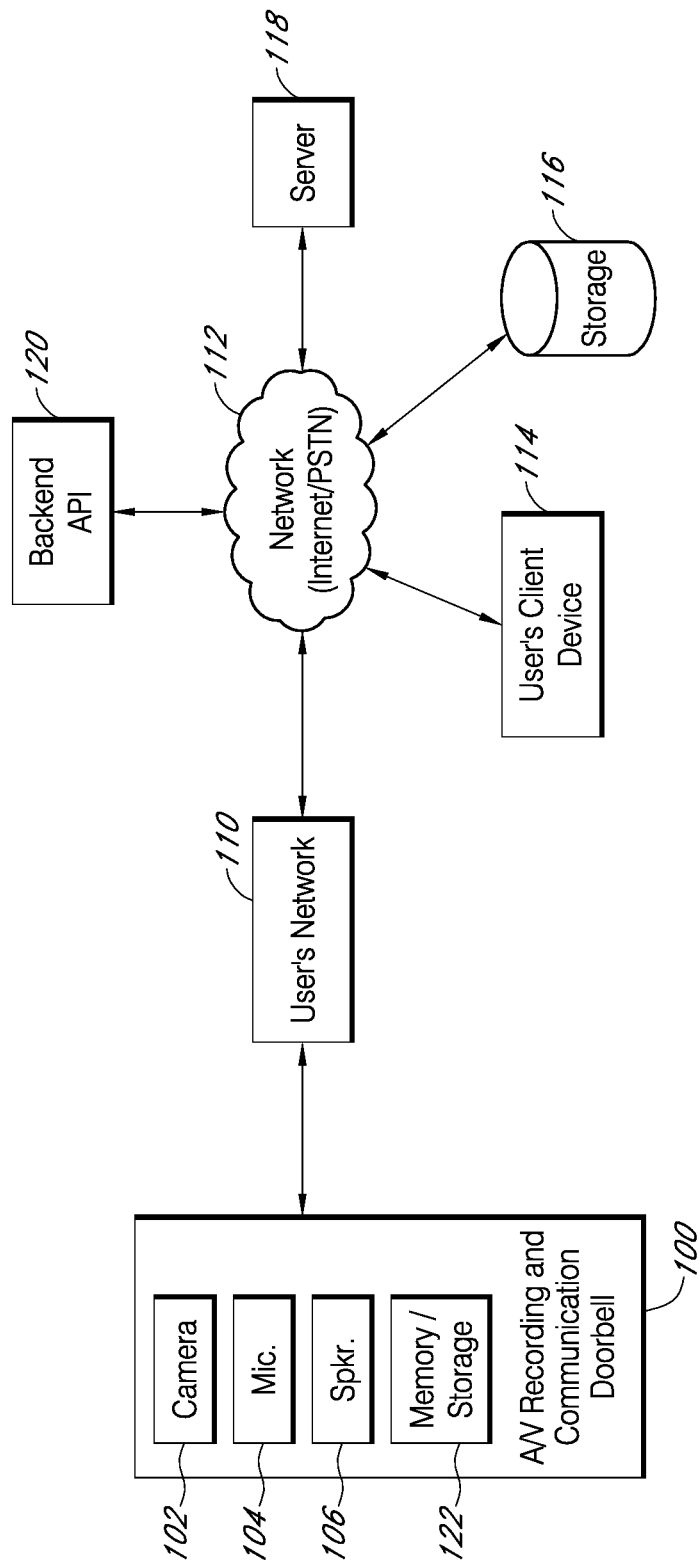
FIG. 2 is a functional block diagram illustrating a system for streaming and storing audio/video content captured by an A/V recording and communication device according to the present disclosure.

With reference to FIG. 2, the present A/V recording and communication doorbell 130 further includes memory/storage 122 (may be referred to interchangeably as memory 122 or storage 122). The memory 122 may comprise, for example, volatile memory, such as RAM, and/or non-volatile memory, such as flash memory, a hard disk device, an optical disk device, or any other type of memory/storage. As described in detail below, the A/V recording and communication device 130 records video footage, streams video footage to the user's client device 114, and uploads video footage to the remote storage device 116. The process advantageously decouples the streaming video signal, which is sent to the user's client device 114, from the stored video signal, which is stored at the local memory 122 of the A/V recording and communication device 130 and later uploaded to the cloud (the remote storage device 116). The stored video signal is thus high-quality, regardless of the available network bit rate at the time the streaming video signal is sent to the user's client device 114. The high-quality stored video signal may include a high framerate, a high bitrate, and/or a high image resolution (such as 720p or 1080p or better).

Many current A/V recording and communication doorbell systems (other than the present embodiments) are incompatible with existing wired doorbell systems. One reason for this incompatibility is that the A/V recording and communication doorbell draws an amount of power from the household AC electrical power supply that is above the threshold necessary for causing the signaling device to sound. The A/V recording and communication doorbell thus causes frequent inadvertent sounding of the signaling device, which is not only bothersome to the home's occupant(s), but also undermines the usefulness of the doorbell. The present embodiments solve this problem by limiting the power consumption of the A/V recording and communication doorbell to an amount that is below the threshold necessary for causing the signaling device to sound. Embodiments of the present A/V recording and communication doorbell can thus be connected to the existing household AC power supply and the existing signaling device without causing inadvertent sounding of the signaling device.

Several advantages flow from the ability of the present embodiments to be connected to the existing household AC power supply. For example, the camera of the present A/V recording and communication doorbell can be powered on continuously. In a typical battery-powered A/V recording and communication doorbell, the camera is powered on only part of the time so that the battery does not drain too rapidly. The present embodiments, by contrast, do not rely on a battery as a primary (or sole) power supply, and are thus able to keep the camera powered on continuously. Because the camera is able to be powered on continuously, it can always be recording, and recorded footage can be continuously stored in a rolling buffer and/or a sliding window. In some embodiments, about 10-15 seconds of recorded footage can be continuously stored in the rolling buffer and/or the sliding window. The buffered video footage may be accompanied by buffered audio, as the microphone 150 may also be powered on continuously and always capturing audio. Also because the camera is able to be powered on continuously, it can be used for motion detection, thus eliminating any need for a separate motion detection device, such as a passive infrared sensor (PIR). Eliminating the PIR simplifies the design of the A/V recording and communication doorbell and enables the doorbell to be made more compact. Also because the camera is able to be powered on continuously, it can be used as a light detector for use in controlling the current state of the IR cut filter and turning the IR LED on and off. Using the camera as a light detector eliminates any need for a separate light detector, thereby further simplifying the design of the A/V recording and communication doorbell and enabling the doorbell to be made even more compact.

Figure 3:
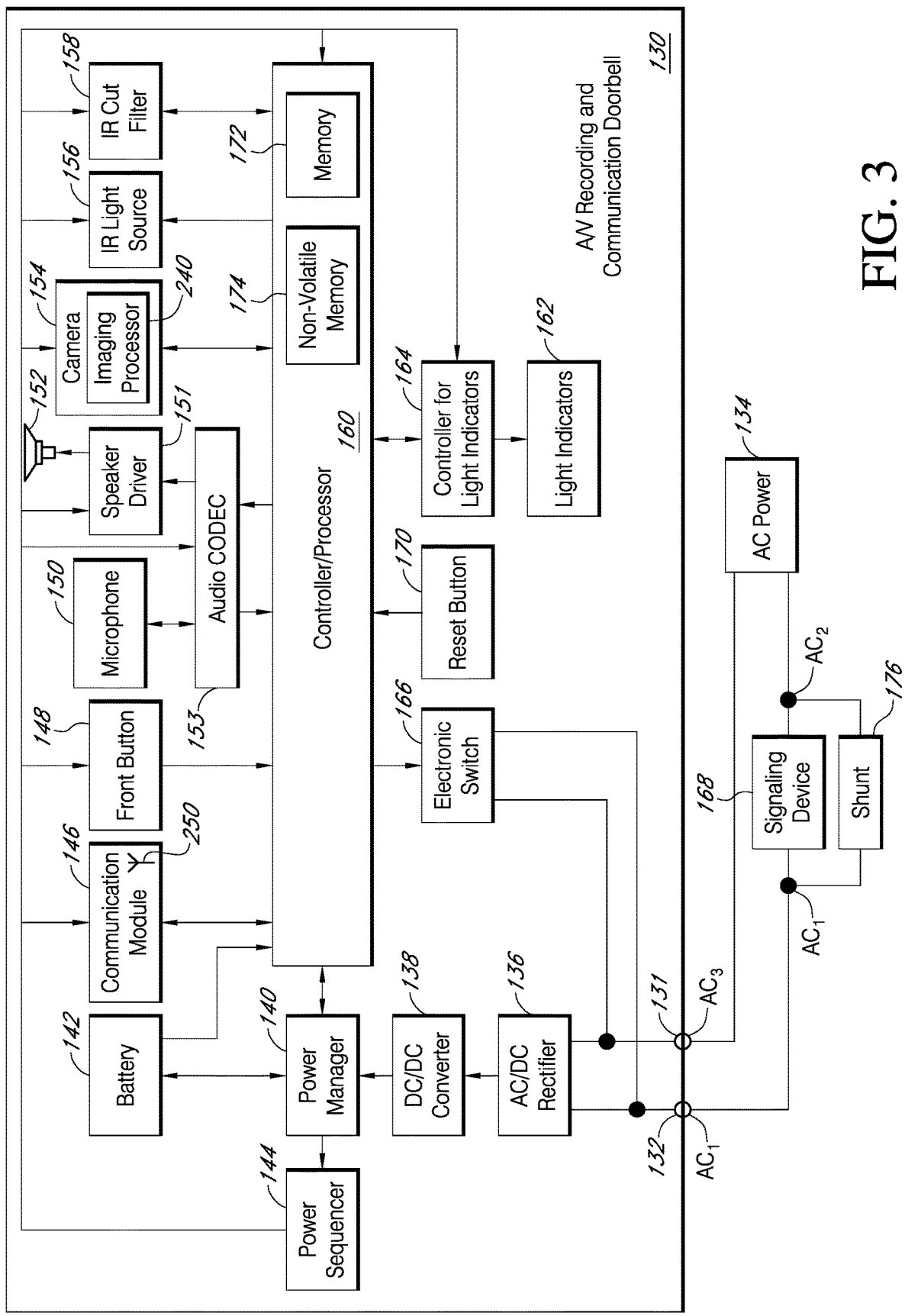
FIG. 3 is a functional block diagram illustrating an embodiment of an A/V recording and communication doorbell according to the present disclosure.

FIGS. 3-13 illustrate one embodiment of a low-power-consumption A/V recording and communication doorbell 130 according to various aspects of the present disclosure. FIG. 3 is a functional block diagram illustrating various components of the A/V recording and communication doorbell 130 and their relationships to one another. For example, the A/V recording and communication doorbell 130 includes a pair of terminals 131, 132 configured to be connected to a source of external AC (alternating-current) power, such as a household AC power supply 134 (may also be referred to as AC mains). The AC power 134 may have a voltage in the range of 16-24 VAC, for example. The incoming AC power 134 may be converted to DC (direct-current) by an AC/DC rectifier 136. An output of the AC/DC rectifier 136 may be connected to an input of a DC/DC converter 138, which may step down the voltage from the output of the AC/DC rectifier 136 from 16-24 VDC to a lower voltage of about 5 VDC, for example. In various embodiments, the output of the DC/DC converter 138 may be in a range of from about 2.5 V to about 7.5 V, for example.

With further reference to FIG. 3, the output of the DC/DC converter 138 is connected to a power manager 140, which may comprise an integrated circuit including a processor core, memory, and/or programmable input/output peripherals. In one non-limiting example, the power manager 140 may be an off-the-shelf component, such as the BQ24773 chip manufactured by Texas Instruments. As described in detail below, the power manager 140 controls, among other things, an amount of power drawn from the external power supply 134, as well as an amount of supplemental power drawn from a battery 142, to power the A/V recording and communication doorbell 130. The power manager 140 may, for example, limit the amount of power drawn from the external power supply 134 so that a threshold power draw is not exceeded. In one non-limiting example, the threshold power, as measured at the output of the DC/DC converter 138, may be equal to 1.4 A. The power manager 140 may also control an amount of power drawn from the external power supply 134 and directed to the battery 142 for recharging of the battery 142. An output of the power manager 140 is connected to a power sequencer 144, which controls a sequence of power delivery to other components of the A/V recording and communication doorbell 130, including a communication module 146, a front button 148, a microphone 150, a speaker driver 151, a speaker 152, an audio CODEC (Coder-DECoder) 153, a camera 154, an infrared (IR) light source 156, an IR cut filter 158, a processor 160 (may also be referred to as a controller 160), a plurality of light indicators 162, and a controller 164 for the light indicators 162. Each of these components is described in detail below. The power sequencer 144 may comprise an integrated circuit including a processor core, memory, and/or programmable input/output peripherals. In one non-limiting example, the power sequencer 144 may be an off-the-shelf component, such as the RT5024 chip manufactured by Richtek.

With further reference to FIG. 3, the A/V recording and communication doorbell 130 further comprises an electronic switch 166 that closes when the front button 148 is pressed. When the electronic switch 166 closes, power from the AC power source 134 is diverted through a signaling device 168 that is external to the A/V recording and communication doorbell 130 to cause the signaling device 168 to emit a sound, as further described below. In one non-limiting example, the electronic switch 166 may be a triac device. The A/V recording and communication doorbell 130 further comprises a reset button 170 configured to initiate a hard reset of the processor 160, as further described below.

With further reference to FIG. 3, the processor 160 may perform data processing and various other functions, as described below. The processor 160 may comprise an integrated circuit including a processor core, memory 172, non-volatile memory 174, and/or programmable input/output peripherals (not shown). The memory 172 may comprise, for example, DDR3 (double data rate type three synchronous dynamic random-access memory). The non-volatile memory 174 may comprise, for example, NAND flash memory. Either or both of the memory 172 and the non-volatile memory 174 may correspond to the memory/storage 122 illustrated in FIG. 2. In the embodiment illustrated in FIG. 3, the memory 172 and the non-volatile memory 174 are illustrated within the box representing the processor 160. It is to be understood that the embodiment illustrated in FIG. 3 is merely an example, and in some embodiments the memory 172 and/or the non-volatile memory 174 are not necessarily physically incorporated with the processor 160. The memory 172 and/or the non-volatile memory 174, regardless of their physical location, may be shared by one or more other components (in addition to the processor 160) of the present A/V recording and communication doorbell 130.

The transfer of digital audio between the user and a visitor may be compressed and decompressed using the audio CODEC 153, which is operatively coupled to the processor 160. When the visitor speaks, audio from the visitor is compressed by the audio CODEC 153, digital audio data is sent through the communication module 146 to the network 112 via the user's network 110, routed by the application server 118 and delivered to the user's client device 114. When the user speaks, after being transferred through the network 112, the user's network 110, and the communication module 146, the digital audio data is decompressed by the audio CODEC 153 and emitted to the visitor through the speaker 152, which is driven by the speaker driver 151.

With further reference to FIG. 3, some of the present embodiments may include a shunt 176 connected in parallel with the signaling device 168. The shunt 176 facilitates the ability of the A/V recording and communication doorbell 130 to draw power from the AC power source 134 without inadvertently triggering the signaling device 168. The shunt 176, during normal standby operation, presents a relatively low electrical impedance, such as a few ohms, across the terminals of the signaling device 168. Most of the current drawn by the A/V recording and communication doorbell 130, therefore, flows through the shunt 176, and not through the signaling device 168. The shunt 176, however, contains electronic circuitry that switches the shunt 176 between a state of low impedance, such as a few ohms, for example, and a state of high impedance, such as >1K ohms, for example. When the front button 148 of the A/V recording and communication doorbell 130 is pressed, the electronic switch 166 closes, causing the voltage from the AC power source 134 to be impressed mostly across the shunt 176 and the signaling device 168 in parallel, while a small amount of voltage, such as about 1V, is impressed across the electronic switch 166. The circuitry in the shunt 176 senses this voltage, and switches the shunt 176 to the high impedance state, so that power from the AC power source 134 is diverted through the signaling device 168. The diverted AC power 134 is above the threshold necessary to cause the signaling device 168 to emit a sound. Pressing the front button 148 of the A/V recording and communication doorbell 130 therefore causes the signaling device 168 to "ring," alerting any person(s) within the structure to which the A/V recording and communication doorbell 130 is mounted that there is a visitor at the front door (or at another location corresponding to the location of the A/V recording and communication doorbell 130). In one non-limiting example, the electronic switch 166 may be a triac device. Further details of the shunt 176 are described in Application Ser. No. 62/308,746, filed on Mar. 15, 2016 and entitled Low-Power-Consumption Audio/Video Recording and Communication Doorbell, which is incorporated herein by reference in its entirety as if fully set forth.

Figure 4:
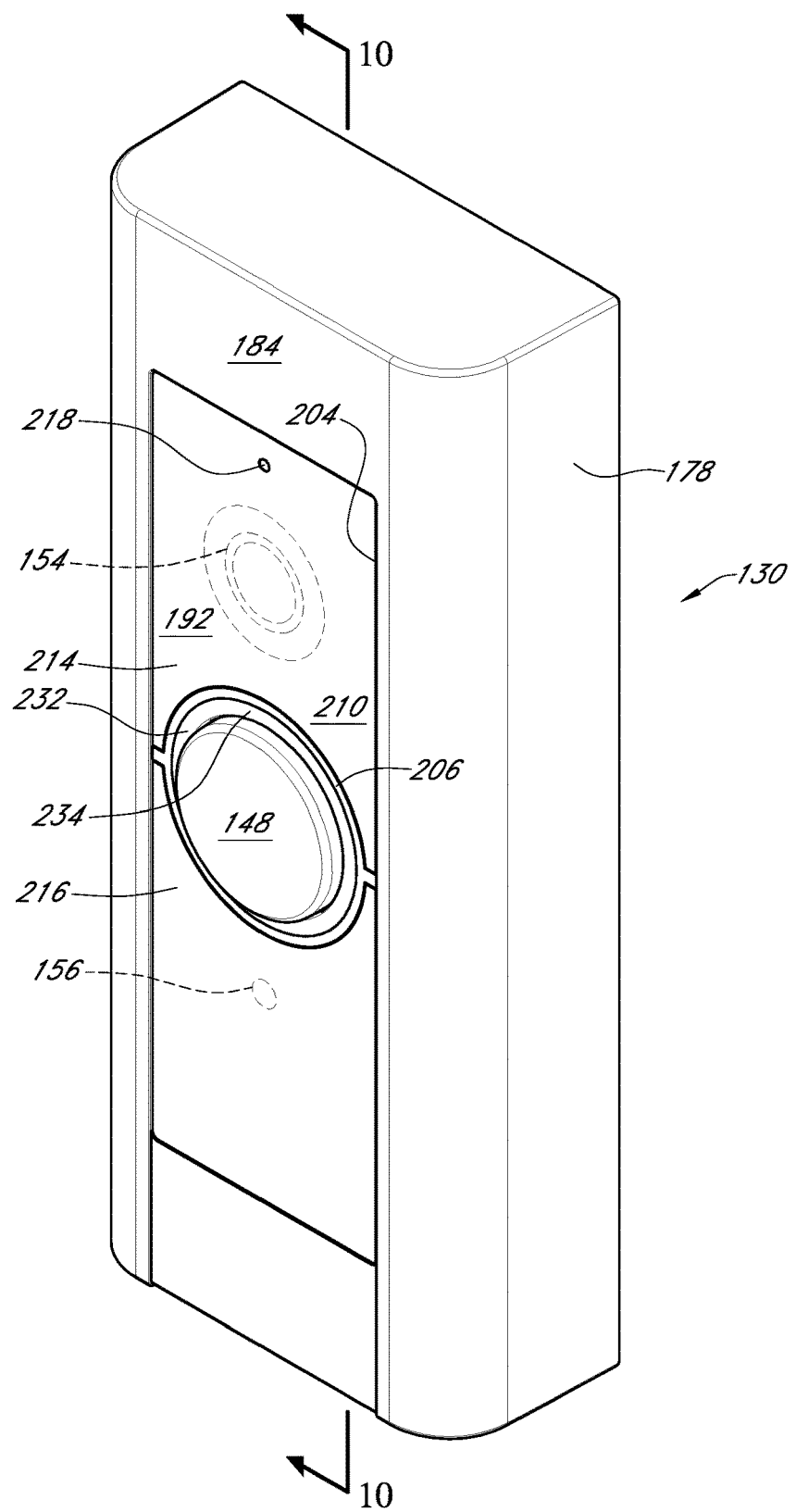
FIG. 4 is a front perspective view of an embodiment of an A/V recording and communication doorbell according to the present disclosure.
Figure 5:
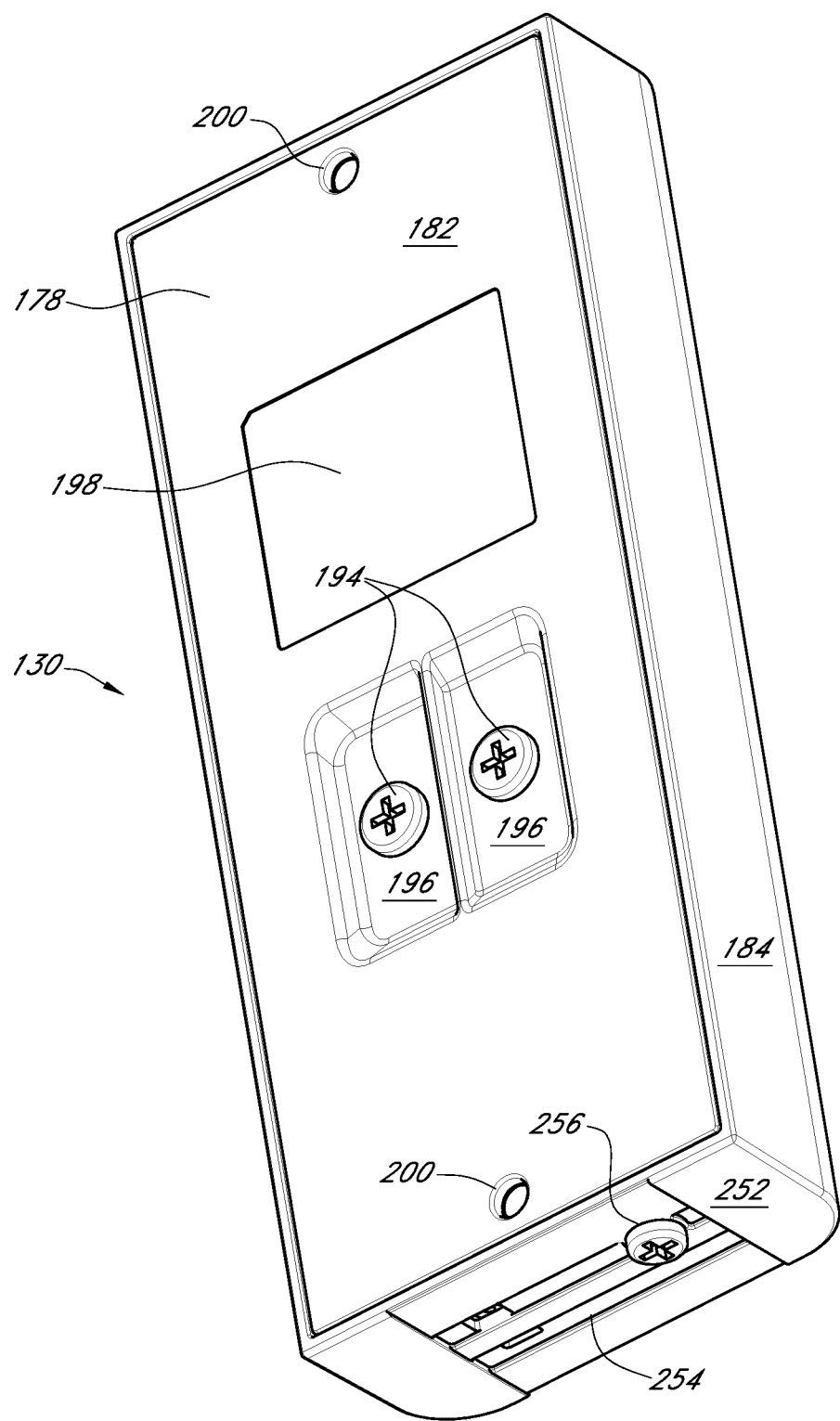
FIG. 5 is a rear perspective view of the A/V recording and communication doorbell of FIG. 4.
Figure 6:
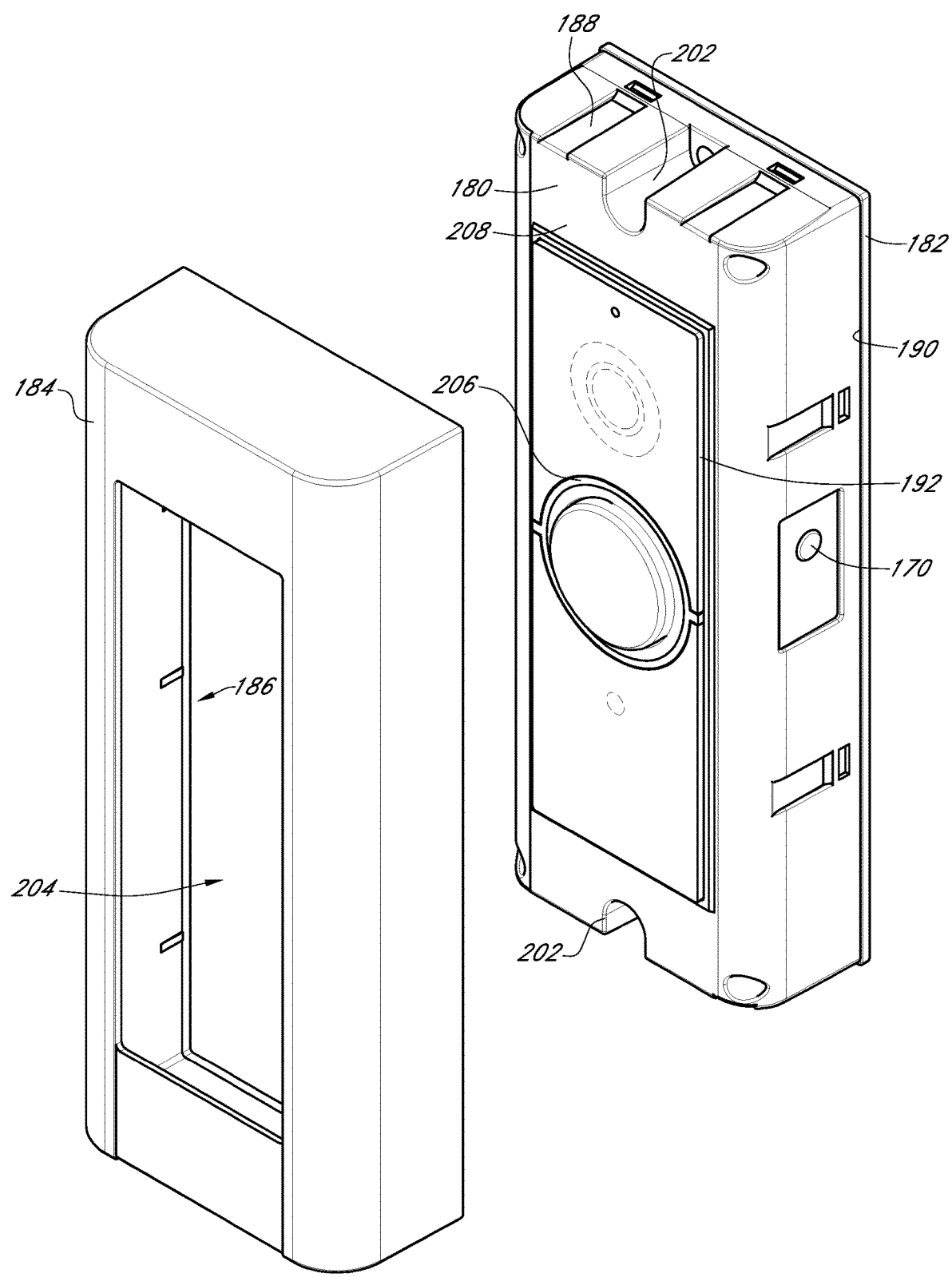
FIG. 6 is a partially exploded front perspective view of the A/V recording and communication doorbell of FIG. 4 showing the cover removed.

With reference to FIGS. 4-6, the A/V recording and communication doorbell 130 further comprises a housing 178 having an enclosure 180 (FIG. 6), a back plate 182 secured to the rear of the enclosure 180, and a shell 184 overlying the enclosure 180. With reference to FIG. 6, the shell 184 includes a recess 186 that is sized and shaped to receive the enclosure 180 in a close fitting engagement, such that outer surfaces of the enclosure 180 abut conforming inner surfaces of the shell 184. Exterior dimensions of the enclosure 180 may be closely matched with interior dimensions of the shell 184 such that friction maintains the shell 184 about the enclosure 180. Alternatively, or in addition, the enclosure 180 and/or the shell 184 may include mating features 188, such as one or more tabs, grooves, slots, posts, etc. to assist in maintaining the shell 184 about the enclosure 180. The back plate 182 is sized and shaped such that the edges of the back plate 182 extend outward from the edges of the enclosure 180, thereby creating a lip 190 against which the shell 184 abuts when the shell 184 is mated with the enclosure 180, as shown in FIGS. 4 and 5. In some embodiments, multiple shells 184 in different colors may be provided so that the end user may customize the appearance of his or her A/V recording and communication doorbell 130. For example, the A/V recording and communication doorbell 130 may be packaged and sold with multiple shells 184 in different colors in the same package.

With reference to FIG. 4, a front surface of the A/V recording and communication doorbell 130 includes the button 148 (may also be referred to as front button 148, FIG. 3), which is operatively connected to the processor 160. In a process similar to that described above with reference to FIG. 1B, when a visitor presses the front button 148, an alert may be sent to the user's client device 114 to notify the user that someone is at his or her front door (or at another location corresponding to the location of the A/V recording and communication doorbell 130). With further reference to FIG. 4, the A/V recording and communication doorbell 130 further includes the camera 154, which is operatively connected to the processor 160, and which is located behind a shield 192. As described in detail below, the camera 154 is configured to capture video images from within its field of view. Those video images can be streamed to the user's client device 114 and/or uploaded to a remote network device for later viewing according to a process similar to that described above with reference to FIG. 1B.

With reference to FIG. 5, a pair of terminal screws 194 extends through the back plate 182. The terminal screws 194 are connected at their inner ends to the terminals 131, 132 (FIG. 3) within the A/V recording and communication doorbell 130. The terminal screws 194 are configured to receive electrical wires to connect to the A/V recording and communication doorbell 130, through the terminals 131, 132, to the household AC power supply 134 of the structure on which the A/V recording and communication doorbell 130 is mounted. In the illustrated embodiment, the terminal screws 194 are located within a recessed portion 196 of the rear surface 198 of the back plate 182 so that the terminal screws 194 do not protrude from the outer envelope of the A/V recording and communication doorbell 130. The A/V recording and communication doorbell 130 can thus be mounted to a mounting surface with the rear surface 198 of the back plate 182 abutting the mounting surface. The back plate 182 includes apertures 200 adjacent to its upper and lower edges to accommodate mounting hardware, such as screws (not shown), for securing the back plate 182 (and thus the A/V recording and communication doorbell 130) to the mounting surface. With reference to FIG. 6, the enclosure 180 includes corresponding apertures 202 adjacent its upper and lower edges that align with the apertures 200 in the back plate 182 to accommodate the mounting hardware. In certain embodiments, the A/V recording and communication doorbell 130 may include a mounting plate or bracket (not shown) to facilitate securing the A/V recording and communication doorbell 130 to the mounting surface.

Figure 10:
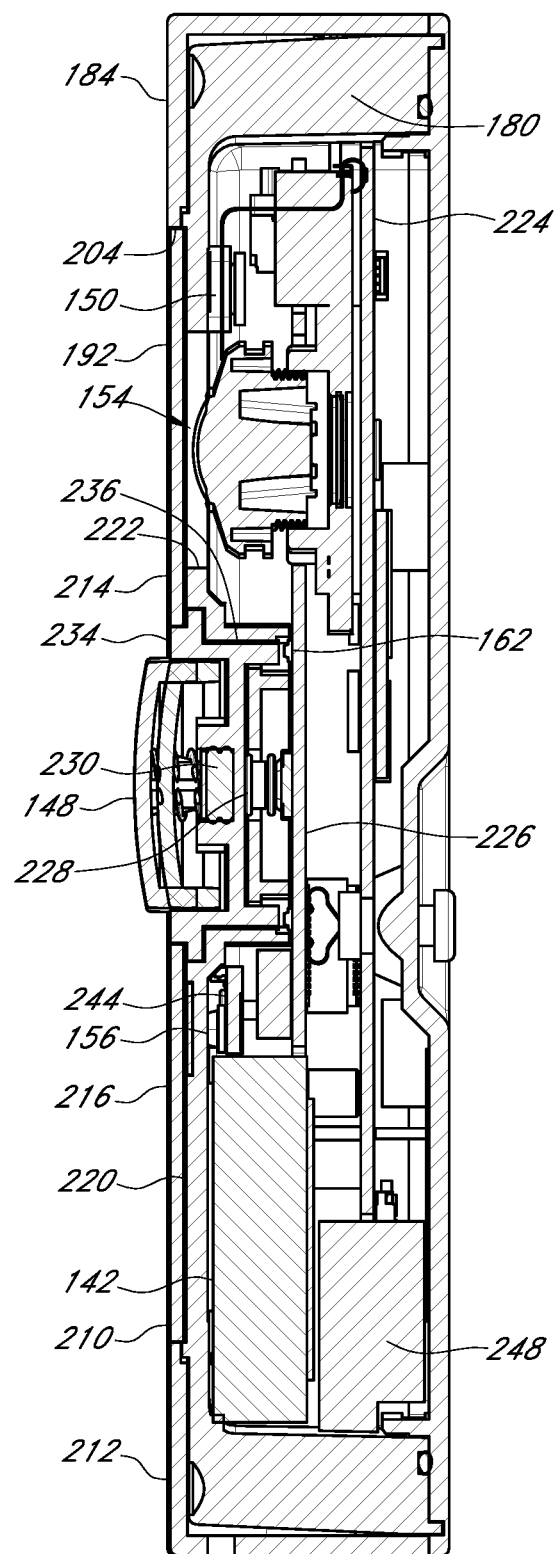
FIG. 10 is a right-side cross-sectional view of the A/V recording and communication doorbell of FIG. 4 taken through the line 10-10 in FIG. 4.

With further reference to FIG. 6, the shell 184 includes a central opening 204 in a front surface. The central opening 204 is sized and shaped to accommodate the shield 192. In the illustrated embodiment, the shield 192 is substantially rectangular, and includes a central opening 206 through which the front button 148 protrudes. The shield 192 defines a plane parallel to and in front of a front surface 208 of the enclosure 180. When the shell 184 is mated with the enclosure 180, as shown in FIGS. 4 and 10, the shield 192 resides within the central opening 204 of the shell 184 such that a front surface 210 of the shield 192 is substantially flush with a front surface 212 of the shell 184 and there is little or no gap (FIG. 4) between the outer edges of the shield 192 and the inner edges of the central opening 204 in the shell 184.

With further reference to FIG. 6, the shield 192 includes an upper portion 214 (located above and to the sides of the front button 148) and a lower portion 216 (located below and to the sides of the front button 148). The upper and lower portions 214, 216 of the shield 192 may be separate pieces, and may comprise different materials. The upper portion 214 of the shield 192 may be transparent or translucent so that it does not interfere with the field of view of the camera 154. For example, in certain embodiments the upper portion 214 of the shield 192 may comprise glass or plastic. As described in detail below, the microphone 150, which is operatively connected to the processor 160, is located behind the upper portion 214 of the shield 192. The upper portion 214, therefore, may include an opening 218 that facilitates the passage of sound through the shield 192 so that the microphone 150 is better able to pick up sounds from the area around the A/V recording and communication doorbell 130.

The lower portion 216 of the shield 192 may comprise a material that is substantially transparent to infrared (IR) light, but partially or mostly opaque with respect to light in the visible spectrum. For example, in certain embodiments the lower portion 216 of the shield 192 may comprise a plastic, such as polycarbonate. The lower portion 216 of the shield 192, therefore, does not interfere with transmission of IR light from the IR light source 156, which is located behind the lower portion 216. As described in detail below, the IR light source 156 and the IR cut filter 158, which are both operatively connected to the processor 160, facilitate "night vision" functionality of the camera 154.

The upper portion 214 and/or the lower portion 216 of the shield 192 may abut an underlying cover 220 (FIG. 10), which may be integral with the enclosure 180 or may be a separate piece. The cover 220, which may be opaque, may include a first opening 222 corresponding to the location of the camera 154, a second opening (not shown) corresponding to the location of the microphone 150 and the opening 218 in the upper portion 214 of the shield 192, and a third opening (not shown) corresponding to the location of the IR light source 156.

Figure 7:
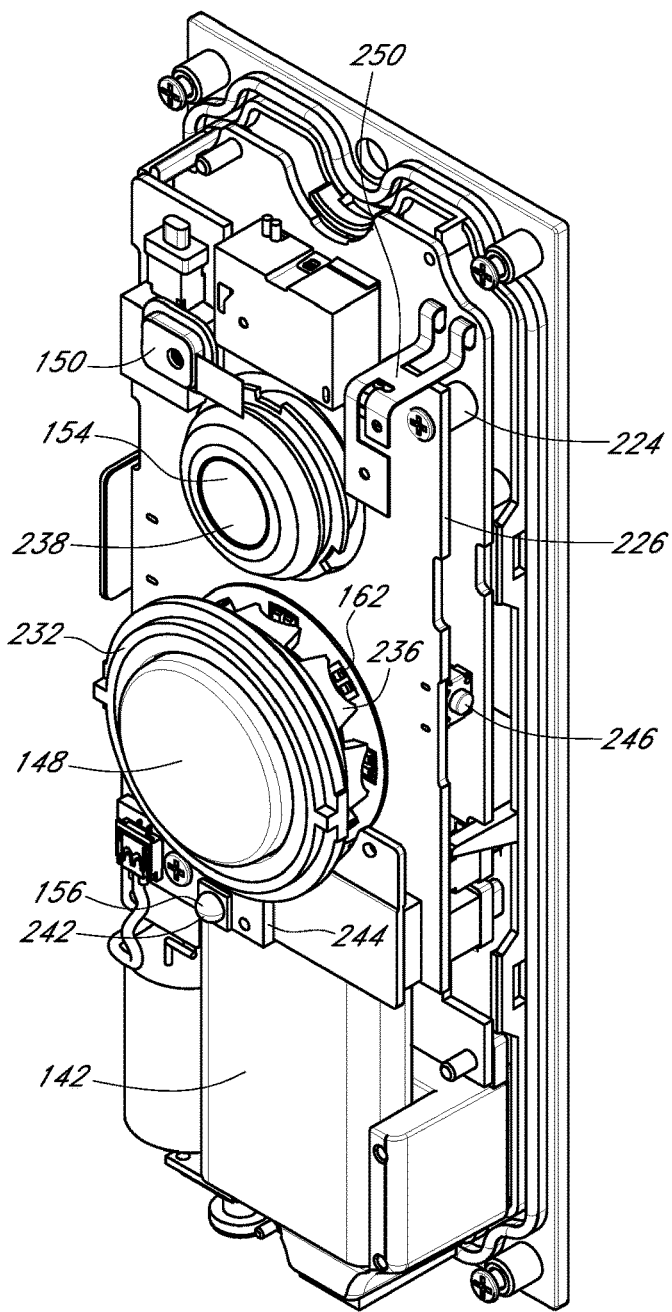
FIGS. 7, 8, and 9 are front perspective views of various internal components of the A/V recording and communication doorbell of FIG. 4.
Figure 8:
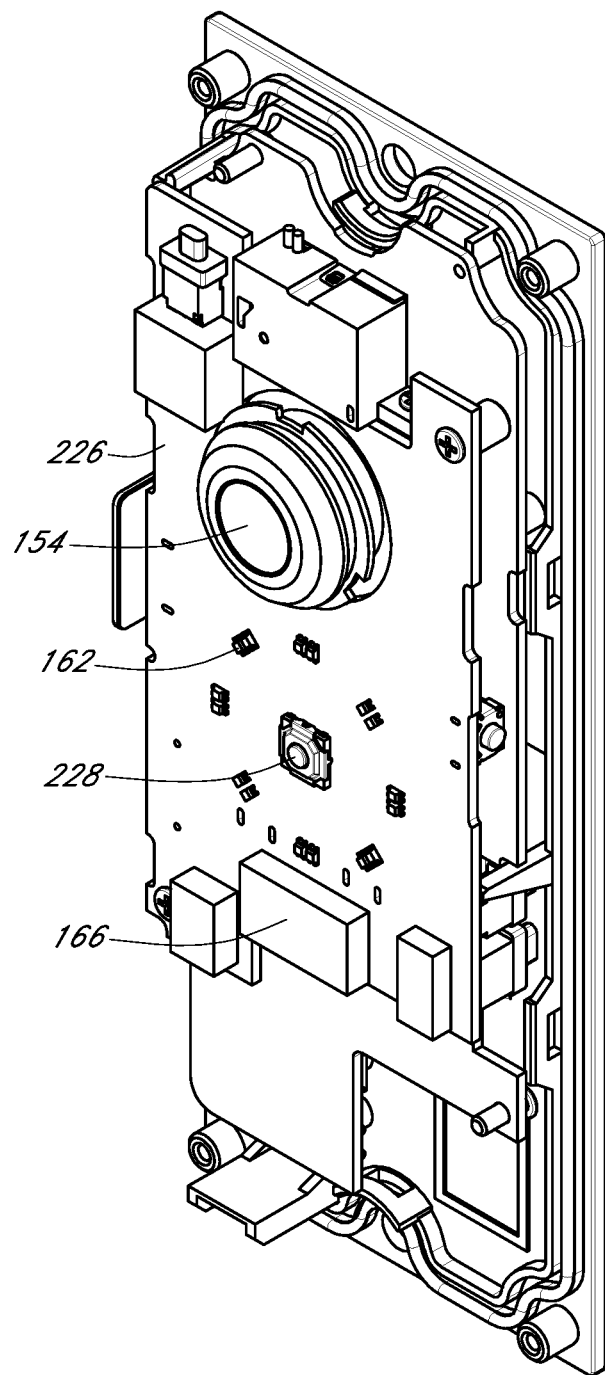
Figure 9:
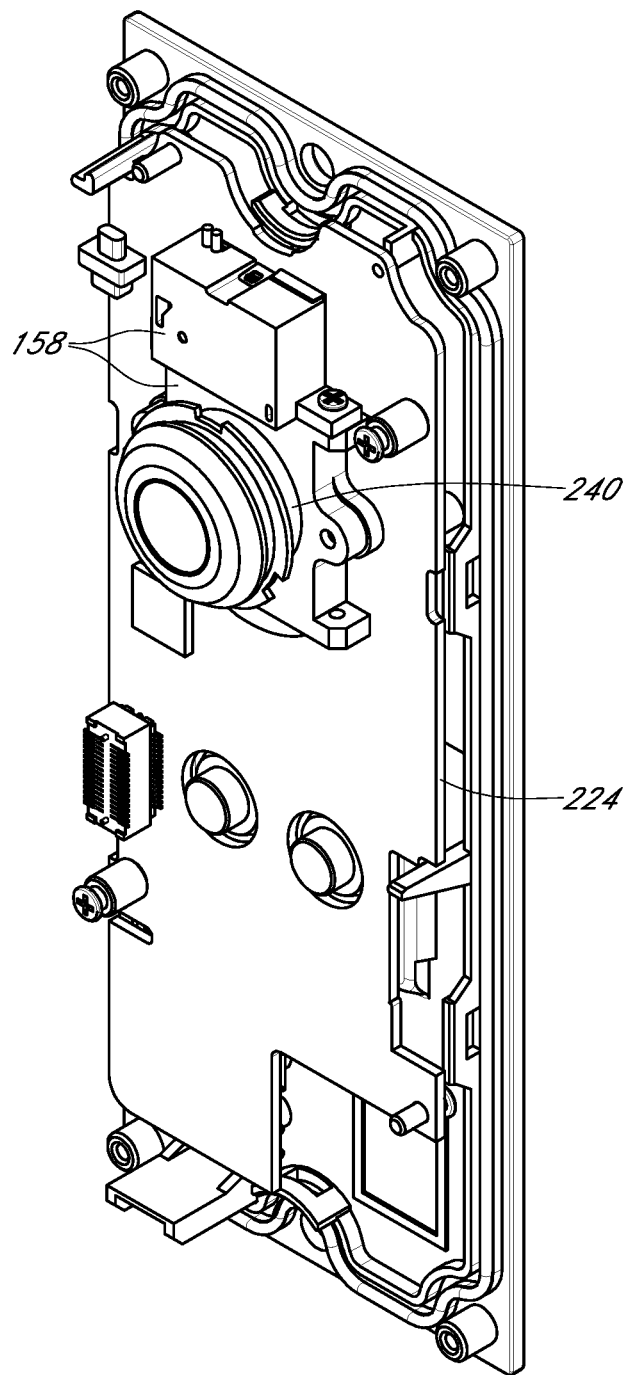

FIGS. 7-10 illustrate various internal components of the A/V recording and communication doorbell 130. FIGS. 7-9 are front perspective views of the A/V recording and communication doorbell 130 with the shell 184 and the enclosure 180 removed, while FIG. 10 is a right-side cross-sectional view of the A/V recording and communication doorbell 130 taken through the line 10-10 in FIG. 4. With reference to FIGS. 7 and 8, the A/V recording and communication doorbell 130 further comprises a main printed circuit board (PCB) 224 and a front PCB 226. With reference to FIG. 8, the front PCB 226 comprises a button actuator 228. With reference to FIGS. 7, 8, and 10, the front button 148 is located in front of the button actuator 228. The front button 148 includes a stem 230 (FIG. 10) that extends into the housing 178 to contact the button actuator 228. When the front button 148 is pressed, the stem 230 depresses the button actuator 228, thereby closing the electronic switch 166 (FIG. 8), as described below.

With reference to FIG. 8, the front PCB 226 further comprises the light indicators 162, which may illuminate when the front button 148 of the A/V recording and communication doorbell 130 is pressed. In the illustrated embodiment, the light indicators 162 comprise light-emitting diodes (LEDs 162) that are surface mounted to the front surface of the front PCB 226 and are arranged in a circle around the button actuator 228. The present embodiments are not limited to the light indicators 162 being LEDs, and in alternative embodiments the light indicators 162 may comprise any other type of light-emitting device. The present embodiments are also not limited by the number of light indicators 162 shown in FIG. 8, nor by the pattern in which they are arranged.

With reference to FIG. 7, the A/V recording and communication doorbell 130 further comprises a light pipe 232. The light pipe 232 is a transparent or translucent ring that encircles the front button 148. With reference to FIG. 4, the light pipe 232 resides in an annular space between the front button 148 and the central opening 206 in the shield 192, with a front surface 234 of the light pipe 232 being substantially flush with the front surface 210 of the shield 192. With reference to FIGS. 7 and 10, a rear portion of light pipe 232 includes a plurality of posts 236 whose positions correspond to the positions of the LEDs 162. When the LEDs 162 are illuminated, light is transmitted through the posts 236 and the body of the light pipe 232 so that the light is visible at the front surface 234 of the light pipe 232. The LEDs 162 and the light pipe 232 thus provide a ring of illumination around the front button 148. The light pipe 232 may comprise a plastic, for example, or any other suitable material capable of transmitting light.

The LEDs 162 and the light pipe 232 may function as visual indicators for a visitor and/or a user. For example, the LEDs 162 may illuminate upon activation or stay illuminated continuously. In one aspect, the LEDs 162 may change color to indicate that the front button 148 has been pressed. The LEDs 162 may also indicate that the battery 142 needs recharging, or that the battery 142 is currently being charged, or that charging of the battery 142 has been completed. The LEDs 162 may indicate that a connection to the user's network is good, limited, poor, or not connected. The LEDs 162 may be used to guide the user through setup or installation steps using visual cues, potentially coupled with audio cues emitted from the speaker 152.

With further reference to FIG. 7, the A/V recording and communication doorbell 130 further comprises a rechargeable battery 142. As described in further detail below, the A/V recording and communication doorbell 130 is connected to an external power source 134 (FIG. 3), such as AC mains. The A/V recording and communication doorbell 130 is primarily powered by the external power source 134, but may also draw power from the rechargeable battery 142 so as not to exceed a threshold amount of power from the external power source 134, to thereby avoid inadvertently sounding the signaling device 168. With reference to FIG. 3, the battery 142 is operatively connected to the power manager 140. As described below, the power manager 140 controls an amount of power drawn from the battery 142 to supplement the power drawn from the external AC power source 134 to power the A/V recording and communication doorbell 130 when supplemental power is needed. The power manager 140 also controls recharging of the battery 142 using power drawn from the external power source 134. The battery 142 may comprise, for example, a lithium-ion battery, or any other type of rechargeable battery.

With further reference to FIG. 7, the A/V recording and communication doorbell 130 further comprises the camera 154. The camera 154 is coupled to a front surface of the front PCB 226, and includes a lens 238 and an imaging processor 240 (FIG. 9). The camera lens 238 may be a lens capable of focusing light into the camera 154 so that clear images may be captured. The camera 154 may comprise, for example, a high definition (HD) video camera, such as one capable of capturing video images at an image display resolution of 1080p or better. In certain of the present embodiments, the camera 154 may be used to detect motion within its field of view, as described below.

With further reference to FIG. 7, the A/V recording and communication doorbell 130 further comprises an infrared (IR) light source 242. In the illustrated embodiment, the IR light source 242 comprises an IR light-emitting diode (LED) 242 coupled to an IR LED printed circuit board (PCB) 244. In alternative embodiments, the IR LED 242 may not comprise a separate PCB 244, and may, for example, be coupled to the front PCB 226.

Figure 7A:
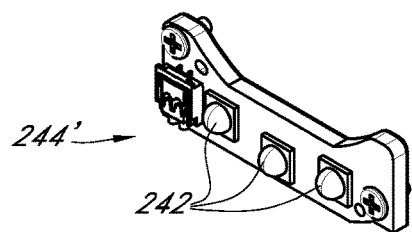
FIG. 7A is a front perspective view of another embodiment of an infrared (IR) light-emitting diode (LED) printed circuit board (PCB) according to various aspects of the present disclosure.

With reference to FIGS. 7 and 10, the IR LED PCB 244 is located below the front button 148 (FIG. 7) and behind the lower portion 216 of the shield 192 (FIG. 10). As described above, the lower portion 216 of the shield 192 is transparent to IR light, but may be opaque with respect to light in the visible spectrum. FIG. 7A illustrates an alternative embodiment of the IR LED PCB 244' comprising three IR LEDs 242. In an embodiment including the IR LED PCB 244' of FIG. 7A, or including any IR LED PCB having more than one IR LED 242, the size of the third opening in the cover may be increased to accommodate the larger size of the IR LED PCB 244'.

The IR LED 242 may be triggered to activate when a low level of ambient light is detected. When activated, IR light emitted from the IR LED 242 illuminates the camera 154's field of view. The camera 154, which may be configured to detect IR light, may then capture the IR light emitted by the IR LED 242 as it reflects off objects within the camera 154's field of view, so that the A/V recording and communication doorbell 130 can clearly capture images at night (may be referred to as "night vision").

With reference to FIG. 9, the A/V recording and communication doorbell 130 further comprises an IR cut filter 158. The IR cut filter 158 is a mechanical shutter that can be selectively positioned between the lens 238 and the image sensor of the camera 154. During daylight hours, or whenever there is a sufficient amount of ambient light, the IR cut filter 158 is positioned between the lens 238 and the image sensor to filter out IR light so that it does not distort the colors of images as the human eye sees them. During nighttime hours, or whenever there is little to no ambient light, the IR cut filter 158 is withdrawn from the space between the lens 238 and the image sensor, so that the camera 154 is sensitive to IR light ("night vision"). In some embodiments, the camera 154 acts as a light detector for use in controlling the current state of the IR cut filter 158 and turning the IR LED 242 on and off. Using the camera 154 as a light detector is facilitated in some embodiments by the fact that the A/V recording and communication doorbell 130 is powered by a connection to AC mains, and the camera 154, therefore, is always powered on. In other embodiments, however, the A/V recording and communication doorbell 130 may include a light sensor separate from the camera 154 for use in controlling the IR cut filter 158 and the IR LED 242.

With reference back to FIG. 6, the A/V recording and communication doorbell 130 further comprises a reset button 170. The reset button 170 contacts a reset button actuator 246 (FIG. 7) coupled to the front PCB 226. When the reset button 170 is pressed, it may contact the reset button actuator 246, which may trigger the erasing of any data stored at the non-volatile memory 174 and/or at the memory 172 (FIG. 3), and/or may trigger a reboot of the processor 160.

Figure 11:
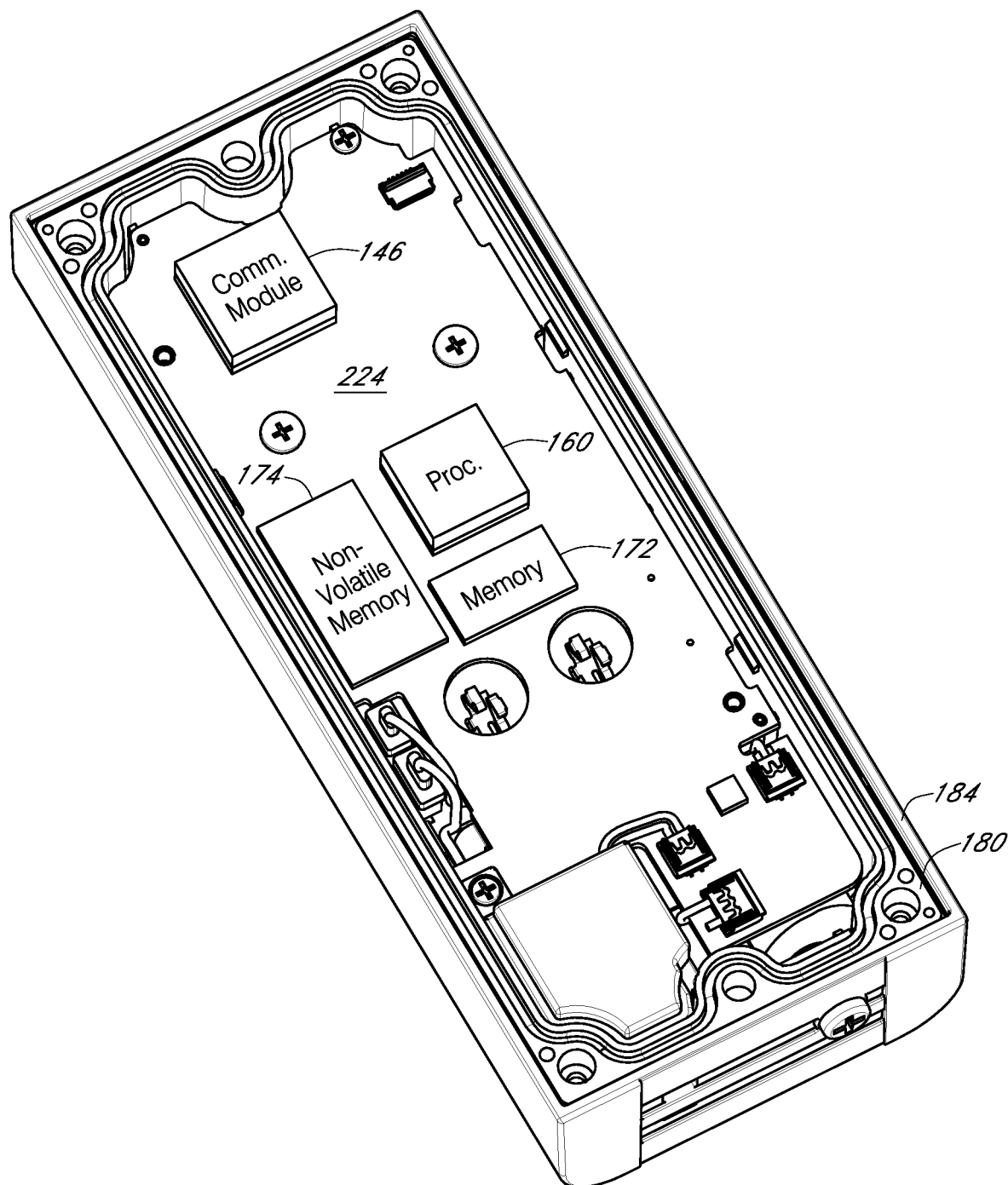
FIGS. 11-13 are rear perspective views of various internal components of the A/V recording and communication doorbell of FIG. 4.
Figure 12:
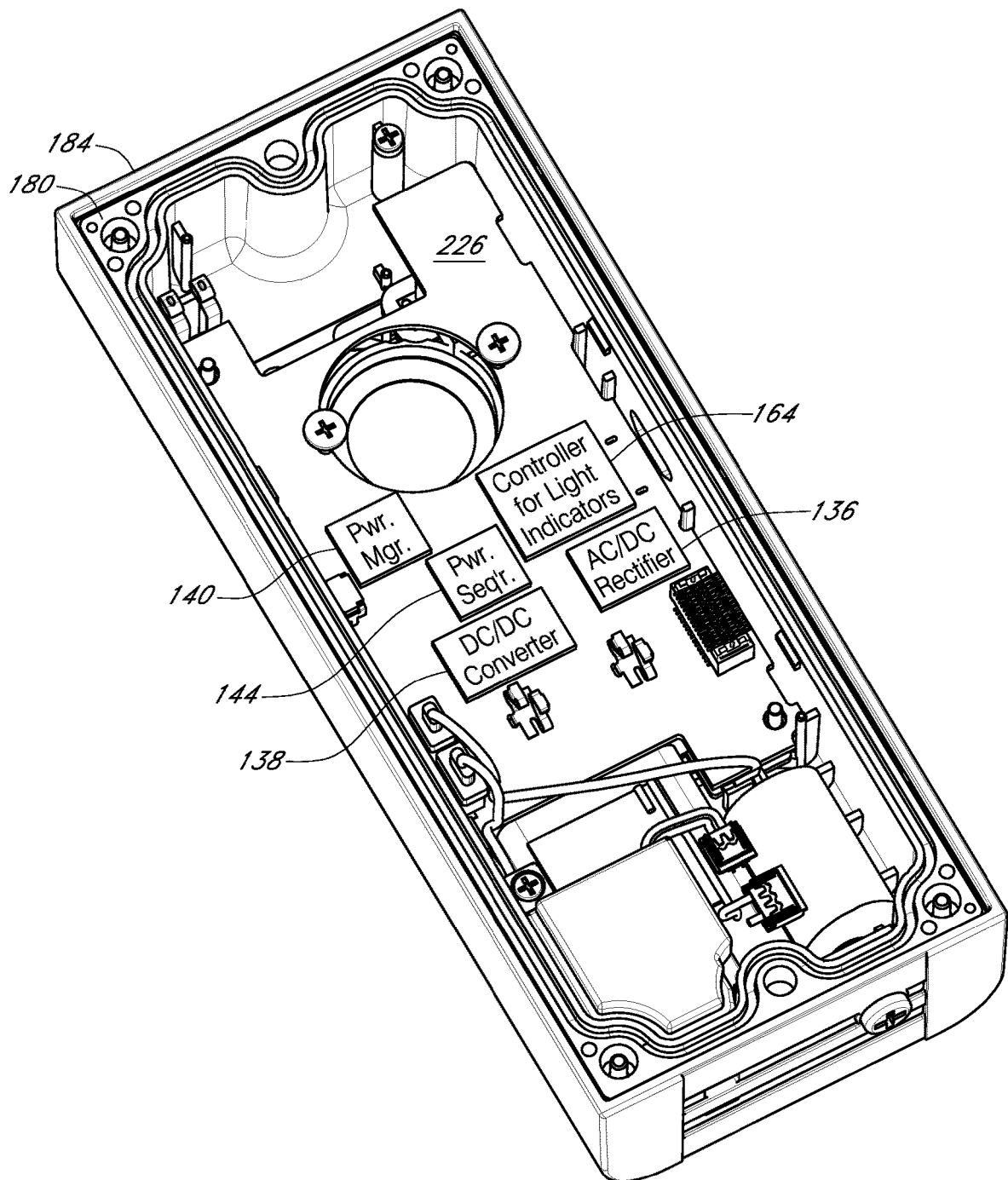
Figure 13:
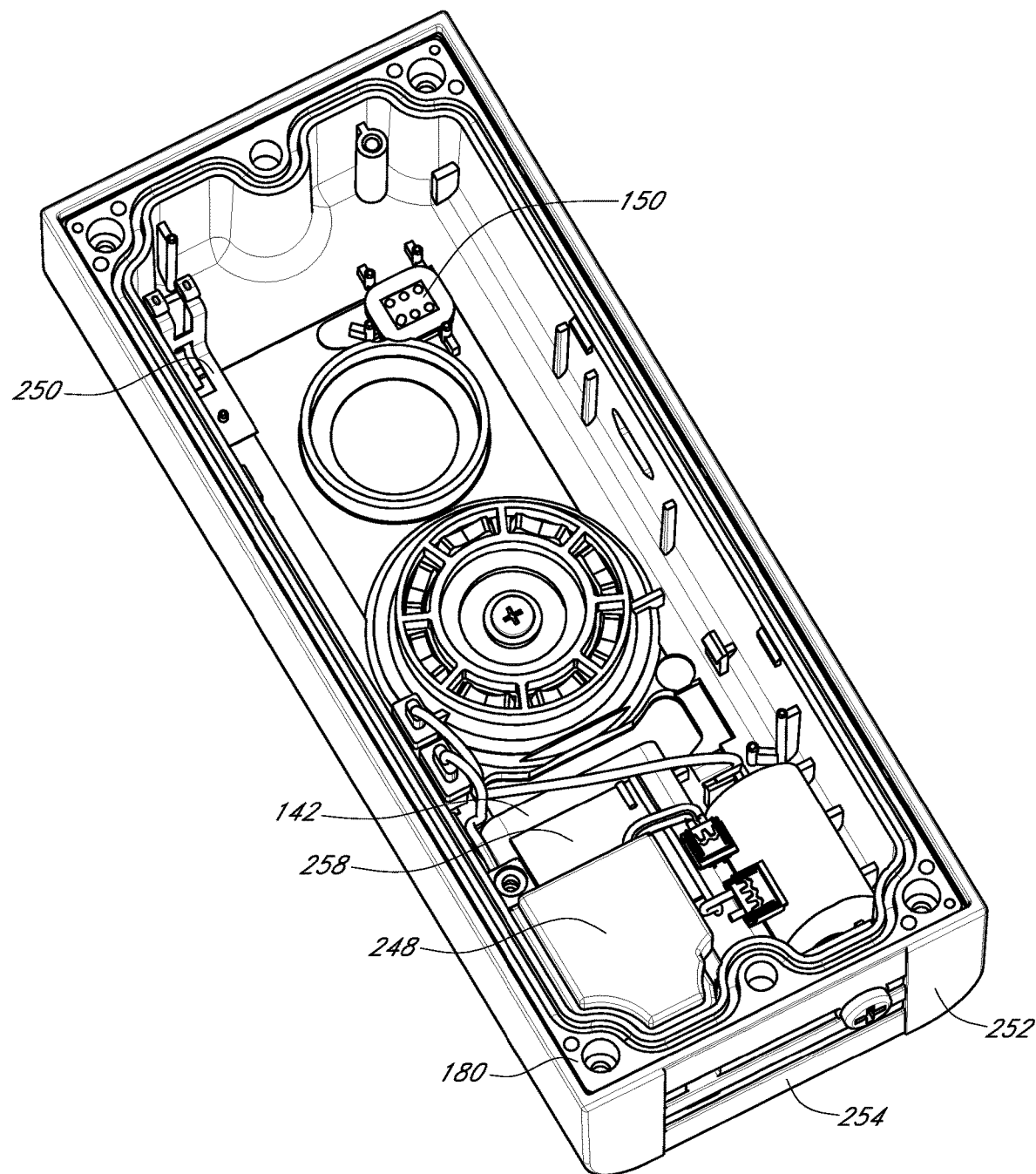

FIGS. 11-13 further illustrate internal components of the A/V recording and communication doorbell 130. FIGS. 11-13 are rear perspective views of the A/V recording and communication doorbell 130 with the back plate 182 and additional components removed. For example, in FIG. 11 the back plate 182 is removed, while in FIG. 12 the back plate 182 and the main PCB 224 are removed, and in FIG. 13 the back plate 182, the main PCB 224, and the front PCB 226 are removed. With reference to FIG. 11, several components are coupled to the rear surface of the main PCB 224, including the communication module 146, the processor 160, memory 172, and non-volatile memory 174. The functions of each of these components are described below. With reference to FIG. 12, several components are coupled to the rear surface of the front PCB 226, including the power manager 140, the power sequencer 144, the AC/DC rectifier 136, the DC/DC converter 138, and the controller 164 for the light indicators 162. The functions of each of these components are also described below. With reference to FIG. 13, several components are visible within the enclosure 180, including the microphone 150, a speaker chamber 248 (in which the speaker 152 is located), and an antenna 250 for the communication module 146. The functions of each of these components are also described below.

With reference to FIG. 7, the antenna 250 is coupled to the front surface of the main PCB 224 and operatively connected to the communication module 146, which is coupled to the rear surface of the main PCB 224 (FIG. 11). The microphone 150, which may also be coupled to the front surface of the main PCB 224, is located near the opening 218 (FIG. 4) in the upper portion 214 of the shield 192 so that sounds emanating from the area around the A/V recording and communication doorbell 130 can pass through the opening 218 and be detected by the microphone 150. With reference to FIG. 13, the speaker chamber 248 is located near the bottom of the enclosure 180. The speaker chamber 248 comprises a hollow enclosure in which the speaker 152 is located. The hollow speaker chamber 248 amplifies the sounds made by the speaker 152 so that they can be better heard by a visitor in the area near the A/V recording and communication doorbell 130. With reference to FIGS. 5 and 13, the lower surface 252 of the shell 184 and the lower surface (not shown) of the enclosure 180 may include an acoustical opening 254 through which the sounds made by the speaker 152 can pass so that they can be better heard by a visitor in the area near the A/V recording and communication doorbell 130. In the illustrated embodiment, the acoustical opening 254 is shaped generally as a rectangle having a length extending substantially across the lower surface 252 of the shell 184 (and also the enclosure 180). The illustrated shape is, however, just one example. With reference to FIG. 5, the lower surface 252 of the shell 184 may further include an opening 256 for receiving a security screw (not shown). The security screw may extend through the opening 256 and into a similarly located opening in the enclosure 180 to secure the shell 184 to the enclosure 180. If the A/V recording and communication doorbell 130 is mounted to a mounting bracket (not shown), the security screw may also maintain the A/V recording and communication doorbell 130 on the mounting bracket.

With reference to FIG. 13, the A/V recording and communication doorbell 130 may further include a battery heater 258. The present A/V recording and communication doorbell 130 is configured for outdoor use, including in cold climates. Cold temperatures, however, can cause negative performance issues for rechargeable batteries, such as reduced energy capacity, increased internal resistance, reduced ability to charge without damage, and reduced ability to supply load current. The battery heater 258 helps to keep the rechargeable battery 142 warm in order to reduce or eliminate the foregoing negative performance issues. In the illustrated embodiment, the battery heater 258 comprises a substantially flat, thin sheet abutting a side surface of the rechargeable battery 142. The battery heater 258 may comprise, for example, an electrically resistive heating element that produces heat when electrical current is passed through it. The battery heater 258 may thus be operatively coupled to the power manager 140 and/or the power sequencer 144 (FIG. 12). In some embodiments, the rechargeable battery 142 may include a thermally sensitive resistor ("thermistor," not shown) operatively connected to the processor 160 so that the battery 142's temperature can be monitored and the amount of power supplied to the battery heater 258 can be adaptively controlled to keep the rechargeable battery 142 within a desired temperature range.

As described above, the present embodiments advantageously limit the power consumption of the A/V recording and communication doorbell to an amount that is below the threshold necessary for causing the signaling device to sound (except when the front button of the doorbell is pressed). The present A/V recording and communication doorbell can thus be connected to the existing household AC power supply and the existing signaling device without causing inadvertent sounding of the signaling device.

Several advantages flow from the ability of the present embodiments to be connected to the existing household AC power supply. For example, the camera of the present A/V recording and communication doorbell can be powered on continuously. In a typical battery-powered A/V recording and communication doorbell, the camera is powered on only part of the time so that the battery does not drain too rapidly. The present embodiments, by contrast, do not rely on a battery as a primary (or sole) power supply, and are thus able to keep the camera powered on continuously. Because the camera is able to be powered on continuously, it can always be recording, and recorded footage can be continuously stored in a rolling buffer and/or a sliding window. In some embodiments, about 10-15 seconds of recorded footage can be continuously stored in the rolling buffer and/or the sliding window. The buffered video footage may be accompanied by buffered audio, as the microphone 150 may also be powered on continuously and always capturing audio. Also because the camera is able to be powered on continuously, it can be used for motion detection, thus eliminating any need for a separate motion detection device, such as a passive infrared sensor (PIR). Eliminating the PIR simplifies the design of the A/V recording and communication doorbell and enables the doorbell to be made more compact. Also because the camera is able to be powered on continuously, it can be used as a light detector for use in controlling the current state of the IR cut filter and turning the IR LED on and off. Using the camera as a light detector eliminates any need for a separate light detector, thereby further simplifying the design of the A/V recording and communication doorbell and enabling the doorbell to be made even more compact.

As discussed above, one aspect of the present embodiments includes the realization that current techniques for recording A/V footage with A/V recording and communication devices frequently do not capture high-quality A/V footage because of limitations in available streaming bandwidth at the time the A/V footage is captured, and/or because of lost packets in the data stream. The present embodiments solve this problem by decoupling the streaming A/V signal from the recorded A/V signal, and uploading the video footage from the recorded A/V signal after the call between the A/V recording and communication device and the user's client device has terminated.

Figure 14:
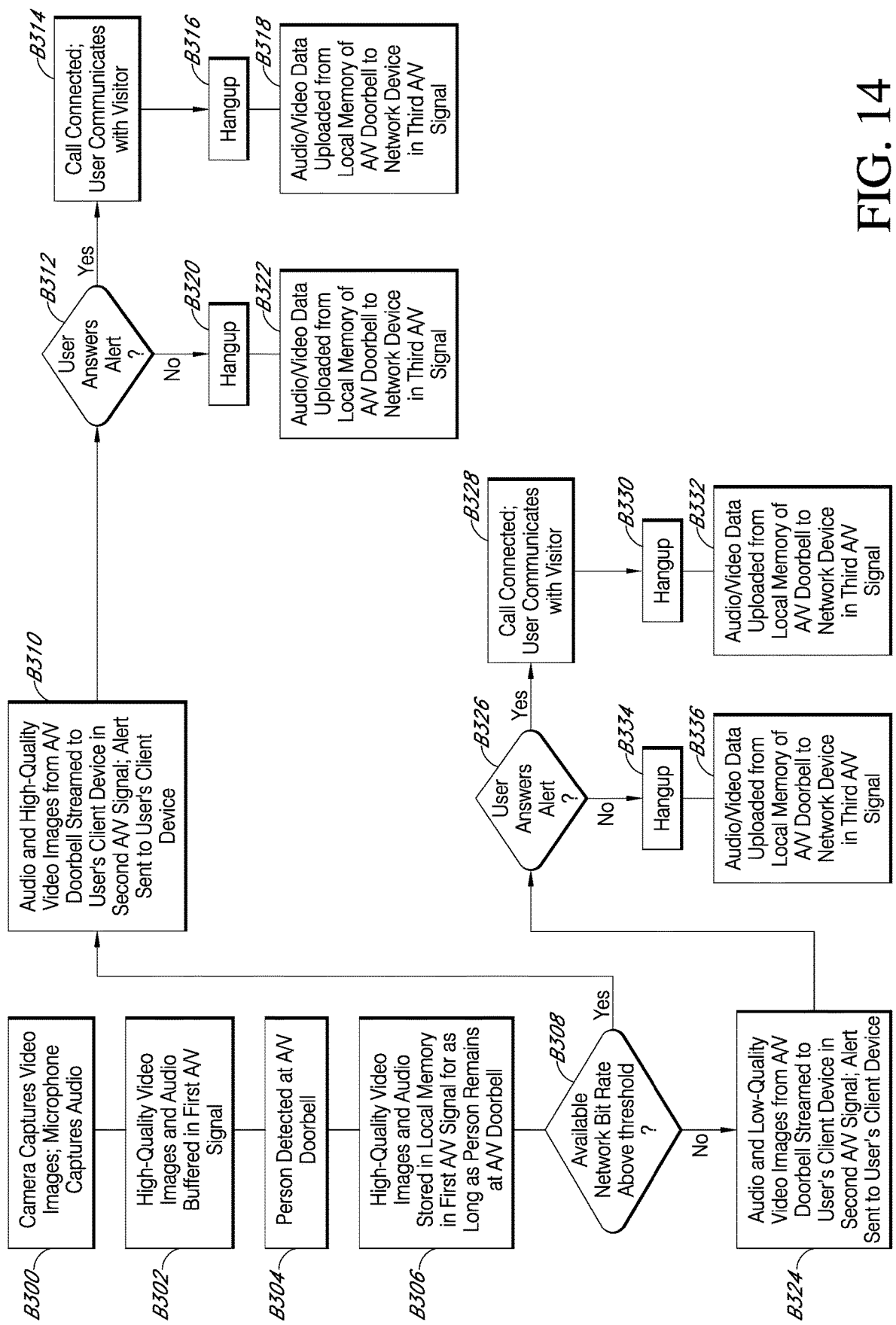
FIG. 14 is a flowchart illustrating another method for streaming and storing A/V content captured by an A/V recording and communication devices according to the present embodiments.

FIG. 14 illustrates one embodiment of a process according to the present embodiments. In the process of FIG. 14, an A/V recording and communication device records video footage, streams video footage to a user's client device, and uploads video footage to a remote storage device. The process advantageously decouples a streaming video signal, which is sent to the user's client device, from a stored video signal, which is stored at a local memory of the A/V recording and communication device and later uploaded to the cloud (the remote storage device). The stored video signal is thus high-quality, regardless of the available network bit rate at the time the streaming video signal is sent to the user's client device. When the locally stored high-quality video is later uploaded to the remote storage device, its high-quality can be preserved, regardless of the available network bit rate at the time of upload, because it doesn't matter how much time is required to complete the upload. In prior art processes, by contrast, the video footage that is uploaded to the remote storage device is the same as the video footage that is streamed to the user's client device. The streamed video footage oftentimes is low-quality, because the video quality must be reduced to provide a usable video stream to the user's client device at times when the available network bit rate is relatively low. Because the uploaded video footage is the same as the streamed video footage, when the streamed video footage is low-quality, so too is the uploaded video footage. The present embodiments overcome this problem and consistently provide high-quality uploaded video footage that can be preserved for later viewing, such as by law enforcement to aid in the identification of criminals, which can lead to lower crime rates and safer neighborhoods. The high-quality stored video signal may include a high framerate, a high bitrate, and/or a high image resolution (such as 720p or 1080p or better).

In the process of FIG. 14, the A/V recording and communication device may comprise the A/V recording and communication doorbell 130 illustrated in FIGS. 3-13 and/or the A/V recording and communication doorbell 100 illustrated in FIGS. 1A and 2. The process of FIG. 14 is, however, applicable to other A/V recording and communication devices. With reference to FIG. 14, the process begins at block B300 when the A/V recording and communication doorbell 130 records video images and audio using the camera 154 and the microphone 150, respectively. As discussed above, in some embodiments the camera 154 of the A/V recording and communication doorbell 130 may always be recording, and recorded footage, such as about 10-15 seconds of footage, may be continuously stored in a rolling buffer and/or a sliding window. The memory 122, for example, may comprise a rolling buffer and/or a sliding window. Although described herein using memory 122 of the A/V recording and communication doorbell 100, in various embodiments, the memory 172 and/or the non-volatile memory 174 of the A/V recording and communication doorbell 130, may perform the same functions of memory 122, as further described below. The buffered video footage may be accompanied by buffered audio, as the microphone 150 may also be powered on continuously and always capturing audio. Thus, at block B302, the recorded video images and audio are stored in the memory 122 in a first audio/video (A/V) signal, also referred to as a stored A/V signal. The stored A/V signal includes high-quality video images, at least because the quality of the video in the stored A/V signal is not dependent upon an available network bit rate. The video images can thus be stored in the memory 122 at a constant bit rate. In some embodiments, the video images may be stored in the memory 122 at a bit rate of at least 2 Mbit/s, such as 4 Mbit/s, or 8 Mbit/s.

In some embodiments, the audio information and the video information in the first A/V signal may be separate streams. That is, the first A/V signal may comprise an audio stream (or first audio signal) and a separate video stream (or first video signal).

The process then moves to block B304, where the A/V recording and communication doorbell 130 detects a person. Detecting the person at the A/V recording and communication doorbell 130 may comprise, for example, the A/V recording and communication doorbell 130 detecting motion within its field of view and/or detecting that the front button 148 of the A/V recording and communication doorbell 130 has been pressed. As discussed above, some embodiments of the A/V recording and communication doorbell 130 use the camera 154 for motion detection, and do not include a separate motion detection device, such as a passive infrared sensor (PIR). It should be understood, however, that the present embodiments are not limited to A/V recording and communication devices that do not include a separate motion detection device. Thus, for example, detecting the person at the A/V recording and communication device may comprise detecting motion using a separate motion detection device, such as one or more PIRs.

With further reference to FIG. 14, at block B306, in response to detecting the person at the A/V recording and communication doorbell 130, the A/V recording and communication doorbell 130 continues storing the recorded video images and audio in the memory 122 in the first (stored) A/V signal. For example, the recorded video images may include images of the person detected at the A/V recording and communication doorbell 130. The video and audio captured after the person is detected, and that is included in the first A/V signal, may continue to be stored in the memory 122 for as long as the detected person remains at the A/V recording and communication doorbell 130. For example, if a call is connected between the visitor and the user, the information in the first A/V signal may continue to be stored in the memory 122 for as long as the call lasts. Alternatively, even if a call is not connected between the visitor and the user, the information in the first A/V signal may continue to be stored in the memory 122 for as long as the A/V recording and communication doorbell 130 continues to detect motion, or until a timer expires. The video and audio captured after the person is detected may be combined with the video and audio that was captured before the person was detected and that was stored in the rolling buffer in the first A/V signal.

With further reference to FIG. 14, at block B308, the process determines an available network bit rate for video streaming. In one non-limiting example embodiment, the determination of the available network bit rate for video streaming may include a feedback mechanism between the A/V recording and communication doorbell 130 and the application server 118. The feedback mechanism may determine packet loss and then use that information to change the bit rate and/or frame rate. The feedback mechanism may be built into the streaming protocol, for example. In one non-limiting example embodiment, the streaming protocol may comprise Real Time Streaming Protocol (RTSP). One or more components of the A/V recording and communication doorbell 130 may be used in the feedback mechanism, such as the controller/processor 160.

If, at block B308, the process determines that the available network bit rate for video streaming is above a threshold, then the process moves to block B310, where audio captured by the microphone 150 and high-quality video images recorded by the camera 154 are streamed (transmitted) from the A/V recording and communication doorbell 130 to the user's client device 114 in a second A/V signal. In non-limiting example embodiments, the threshold network bit rate may be about 600 kbps, or about 800 kbps, or about 1 Mbps, or any other number. Also at block B310, an alert is transmitted to the user's client device 114. The alert may provide the user at the client device 114 with an audible tone and/or a vibration signal that alerts the user to the streaming video images on the display of the client device 114.

In some embodiments, the audio information and the video information in the second A/V signal may be separate streams. That is, the second A/V signal may comprise an audio stream (or second audio signal) and a separate video stream (or second video signal).

The process then moves to block B312, where the process determines whether the user has answered the alert. If it is determined that the user has answered the alert, then the process moves to block B314, where a call is connected between the visitor at the A/V recording and communication doorbell 130 and the user at the client device 114. When the call between the visitor and the user is completed, the process moves to block B316, where the call is terminated (hangup). The process then moves to block B318, where the high-quality video and audio that was stored at the memory 122 at block B306 is uploaded to the cloud, such as the remote storage device 116 in FIG. 1A, in a third A/V signal. At blocks B308-B314, the high-quality video and audio captured by the A/V recording and communication doorbell 130 continues to be stored at the memory 122. Thus, at block B318, all of the high-quality video and audio that was stored at the memory 122 at blocks B306-B314 may be uploaded to the cloud. During the upload process, the high-quality and/or high bit rate of the stored video may be preserved, because there is no requirement for the upload process to be completed quickly due to the decoupling of the uploaded video information from the video that was earlier streamed to the user's client device 114.

Referring back to block B312, if it is determined that the user has not answered the alert, then the process moves to block B320, where the streaming video sent to the user's client device 114 is terminated (hangup). The process then moves to block B322, where the video and audio that was stored at the memory 122 at block B306 is uploaded to the cloud, such as the remote storage device 116 in FIG. 1A, in a third A/V signal. At blocks B308-B312, the video and audio captured by the A/V recording and communication doorbell 130 continues to be stored at the memory 122. Thus, at block B322, all of the video and audio that was stored at the memory 122 at blocks B306-B312 may be uploaded to the cloud. During the upload process, the high-quality and/or high bit rate of the stored video may be preserved, because there is no requirement for the upload process to be completed quickly due to the decoupling of the uploaded video information from the video that was earlier streamed to the user's client device 114. The high-quality of the stored video may include a high framerate, a high bitrate, and/or a high image resolution (such as 720p or 1080p or better).

Referring back to block B308, if it is determined that the available network bit rate for video streaming is below the threshold, then the process moves to block B324, where audio captured by the microphone 150 and a low-quality version of the video images recorded by the camera 154 are streamed (transmitted) from the A/V recording and communication doorbell 130 to the user's client device 114 in a second A/V signal. Also at block B310, an alert is transmitted to the user's client device 114. The alert may provide the user at the client device 114 with an audible tone and/or a vibration signal that alerts the user to the streaming video images on the display of the client device 114.

The process then moves to block B326, where the process determines whether the user has answered the alert. If it is determined that the user has answered the alert, then the process moves to block B328, where a call is connected between the visitor at the A/V recording and communication doorbell 130 and the user at the client device 114. When the call between the visitor and the user is completed, the process moves to block B330, where the call is terminated (hangup). The process then moves to block B332, where the high-quality video and audio that was stored at the memory 122 at block B306 is uploaded to the cloud, such as the remote storage device 116 in FIG. 1A, in a third A/V signal. At blocks B308 and B324-B328, the high-quality video and audio captured by the A/V recording and communication doorbell 130 continues to be stored at the memory 122. Thus, at block B332, all of the high-quality video and audio that was stored at the memory 122 at blocks B306, B308, and B324-B328 may be uploaded to the cloud. During the upload process, the high-quality and/or high bit rate of the stored video may be preserved, because there is no requirement for the upload process to be completed quickly due to the decoupling of the uploaded video information from the video that was earlier streamed to the user's client device 114.

In some embodiments, the audio information and the video information in the third A/V signal may be separate streams. That is, the third A/V signal may comprise an audio stream (or third audio signal) and a separate video stream (or third video signal).

Referring back to block B326, if it is determined that the user has not answered the alert, then the process moves to block B334, where the streaming video sent to the user's client device 114 is terminated (hangup). The process then moves to block B336, where the video and audio that was stored at the memory 122 at block B306 is uploaded to the cloud, such as the remote storage device 116 in FIG. 1A, in a third A/V signal. At blocks B308, B324, and B326, the video and audio captured by the A/V recording and communication doorbell 130 continues to be stored at the memory 122. Thus, at block B336, all of the video and audio that was stored at the memory 122 at blocks B306, B308, B324, and B326 may be uploaded to the cloud. During the upload process, the high-quality and/or high bit rate of the stored video may be preserved, because there is no requirement for the upload process to be completed quickly due to the decoupling of the uploaded video information from the video that was earlier streamed to the user's client device 114. The high-quality of the stored video may include a high framerate, a high bitrate, and/or a high image resolution (such as 720p or 1080p or better).

While not shown in FIG. 14, if the user answers the alert at block B312 or at block B326 and the call is connected at block B314 or at block B328, then the audio generated at the user's end (the audio captured by the microphone of the user's client device 114) may be stored and later uploaded. The uploaded user's audio may be combined with the uploaded visitor's audio and stored at the remote storage device 116. In one non-limiting example embodiment, the application server 118 may combine the inbound audio stream from the user's client device 114 and, in the case of multiple client devices (where more than one user is connected to the call), the application server 118 may combine all inbound audio streams from the multiple client devices, and send that information to the A/V recording and communication doorbell 130. The A/V recording and communication doorbell 130 may then combine all the audio, including the audio recorded by the microphone 150, and send the audio to the remote storage device 116. In another non-limiting example embodiment, the combining of the audio from the A/V recording and communication doorbell 130 and the user's client device(s) 114, and/or the making of the final audio file, may take place in the cloud, such as at the remote storage device 116.

Figure 15:
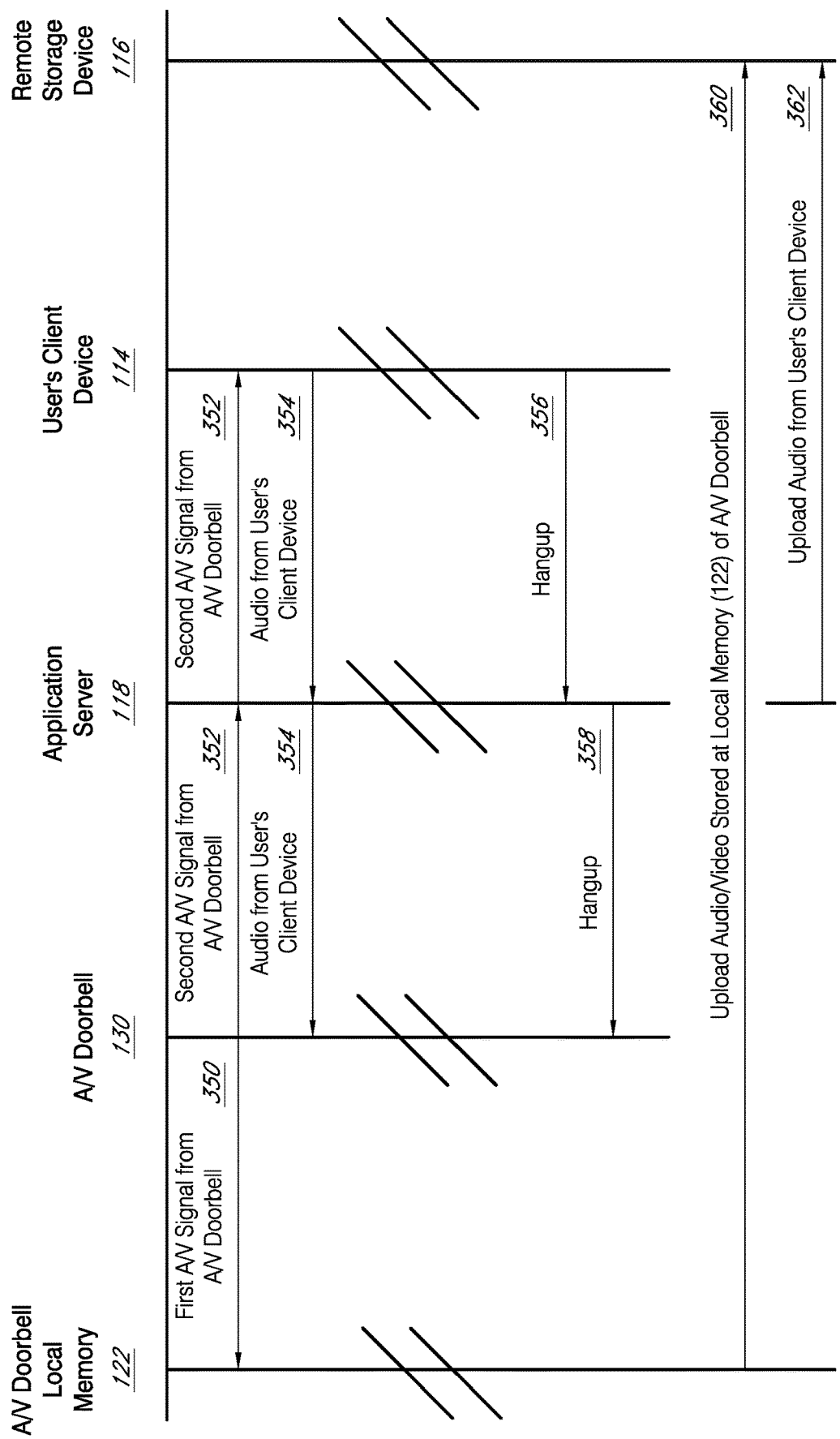
FIG. 15 is a sequence diagram illustrating a method for streaming and storing A/V content captured by an A/V recording and communication device according to the present embodiments.

FIG. 15 is a sequence diagram illustrating a method for streaming and storing A/V content captured by an A/V recording and communication device according to the present embodiments. In the sequence of FIG. 15, the A/V recording and communication device is the A/V recording and communication doorbell 130 illustrated in FIGS. 3-13. The sequence of FIG. 15 is, however, applicable to other A/V recording and communication devices.

The sequence of FIG. 15 may be initiated when the A/V recording and communication doorbell 130 detects a person, such as described above with respect to block B304. Of course, in the sequence of FIG. 15 the aspects described above with respect to blocks B300 and B302 may occur prior to the person being detected at the A/V recording and communication doorbell 130. With reference to FIG. 15, the video and audio captured by the A/V recording and communication doorbell 130 is stored at the local memory 122 in the first (stored) A/V signal 350. This aspect may be similar to the aspects described above with respect to block B306. At about the same time as, or close in time to, the video and audio captured by the A/V recording and communication doorbell 130 being stored at the local memory 122 in the first A/V signal 350, the video and audio captured by the A/V recording and communication doorbell 130 is streamed (transmitted) to the user's client device 114 via the application server 118 in the second A/V signal 352. This aspect may be similar to the aspects described above with respect to blocks B308, B310, and/or B324. Thus, at about the same time as, or close in time to, the video and audio captured by the A/V recording and communication doorbell 130 being streamed to the user's client device 114 via the application server 118 in the second A/V signal 352, an alert may also be sent from the A/V recording and communication doorbell 130 to the user's client device 114 via the application server 118.

With further reference to FIG. 15, if the user answers the alert, then a call is connected between the visitor at the A/V recording and communication doorbell 130 and the user at the client device 114 (may be similar to the aspects described above with respect to blocks B312, B314, B326, and/or B328) and the audio from the user's client device 114 is streamed (transmitted) 354 to the A/V recording and communication doorbell 130 via the application server 118. The call between the visitor at the A/V recording and communication doorbell 130 and the user at the client device 114 may continue for any length of time (as represented by the break lines in FIG. 15) until the user hangs up 356 or until the application server 118 hangs up 358, which may happen, for example, if the call between the A/V recording and communication doorbell 130 and the user's client device 114 times out.

With further reference to FIG. 15, after hangup 356, 358, the A/V recording and communication doorbell 130 reads out the video and audio stored at the A/V doorbell local memory 122 and then transmits (uploads) the video and audio 360 from the A/V recording and communication doorbell 130 to the remote storage device 116. In some embodiments, the uploaded video and audio 360 may be transmitted from the A/V recording and communication doorbell 130 to the remote storage device 116 via the application server 118. The user's audio captured by the microphone of the user's client device 114 is also transmitted (uploaded) 362 from the application server 118 to the remote storage device 116. The uploaded user's audio 362 may be combined with the uploaded visitor's audio 360 at the remote storage device 116.

In some embodiments, the process 360 of uploading the video and audio stored at the A/V doorbell local memory 122 from the A/V recording and communication doorbell 130 to the remote storage device 116 uses a reliable data protocol, such as Transmission Control Protocol (TCP). TCP is a core protocol of the Internet protocol suite. TCP provides reliable, ordered, and error-checked delivery of a stream of octets between applications running on hosts communicating over an IP network. Because the upload process 360 uses a reliable data protocol, none of the packets are lost in the upload process 360, resulting in a high-quality, complete copy of the video and audio information stored at the local memory 122 of the A/V recording and communication doorbell 130.

As described above, the present embodiments advantageously decouple a streaming video signal, which is sent to a client device, from a stored video signal, which is stored at local memory of the A/V recording and communication device and later uploaded to the cloud (the remote storage device). The stored video signal is thus high-quality, regardless of the available network bit rate at the time the streaming video signal is sent to the user's client device. When the locally stored high-quality video is later uploaded to the remote storage device, its high-quality can be preserved, regardless of the available network bit rate at the time of upload, because it doesn't matter how much time is required to complete the upload. In prior art processes, by contrast, the video footage that is uploaded to the remote storage device is the same as the video footage that is streamed to the user's client device. The streamed video footage oftentimes is low-quality, because the video quality must be reduced to provide a usable video stream to the user's client device at times when the available network bit rate is relatively low. Because the uploaded video footage is the same as the streamed video footage, when the streamed video footage is low-quality, so too is the uploaded video footage. The present embodiments overcome this problem and consistently provide high-quality uploaded video footage that can be preserved for later viewing, such as by law enforcement to aid in the identification of criminals, which can lead to lower crime rates and safer neighborhoods.

The present embodiments have been described with reference to the A/V recording and communication doorbell 130 illustrated in FIGS. 3-13. It should be understood, however, that the present embodiments are equally applicable to any A/V recording and communication device that is capable of recording video footage and/or audio and transmitting the recorded video footage and/or audio over a wired and/or wireless network. In certain embodiments, for example, the A/V recording and communication device may not be a doorbell, but may be, for example, an A/V recording and communication security camera.

Figure 16:
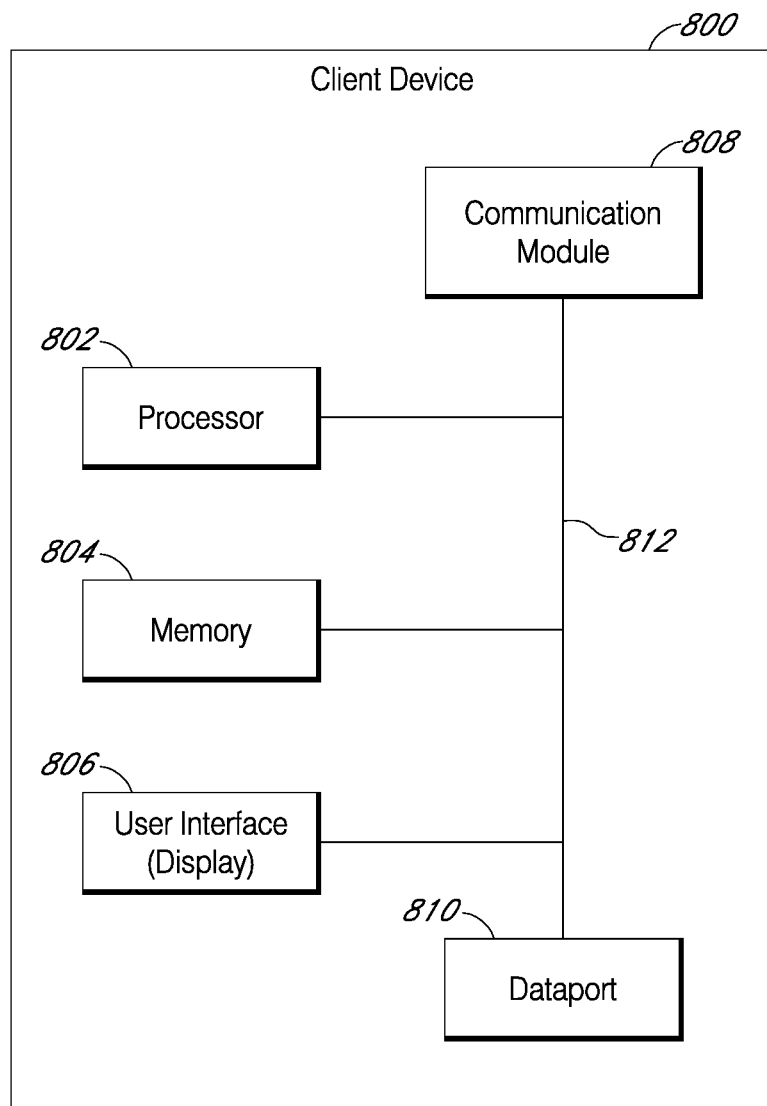
FIG. 16 is a functional block diagram of a client device on which the present embodiments may be implemented according to various aspects of the present disclosure.

FIG. 16 is a functional block diagram of a client device 800 on which the present embodiments may be implemented according to various aspects of the present disclosure. The user's client device 114 described with reference to FIG. 1A may include some or all of the components and/or functionality of the client device 800. The client device 800 may comprise, for example, a smartphone.

With reference to FIG. 16, the client device 800 includes a processor 802, a memory 804, a user interface 806, a communication module 808, and a dataport 810. These components are communicatively coupled together by an interconnect bus 812. The processor 802 may include any processor used in smartphones and/or portable computing devices, such as an ARM processor (a processor based on the RISC (reduced instruction set computer) architecture developed by Advanced RISC Machines (ARM).). In some embodiments, the processor 802 may include one or more other processors, such as one or more conventional microprocessors, and/or one or more supplementary co-processors, such as math co-processors.

The memory 804 may include both operating memory, such as random access memory (RAM), as well as data storage, such as read-only memory (ROM), hard drives, flash memory, or any other suitable memory/storage element. The memory 804 may include removable memory elements, such as a CompactFlash card, a MultiMediaCard (MMC), and/or a Secure Digital (SD) card. In some embodiments, the memory 804 may comprise a combination of magnetic, optical, and/or semiconductor memory, and may include, for example, RAM, ROM, flash drive, and/or a hard disk or drive. The processor 802 and the memory 804 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 802 may be connected to the memory 804 via the dataport 810.

The user interface 806 may include any user interface or presentation elements suitable for a smartphone and/or a portable computing device, such as a keypad, a display screen, a touchscreen, a microphone, and a speaker. The communication module 808 is configured to handle communication links between the client device 800 and other, external devices or receivers, and to route incoming/outgoing data appropriately. For example, inbound data from the dataport 810 may be routed through the communication module 808 before being directed to the processor 802, and outbound data from the processor 802 may be routed through the communication module 808 before being directed to the dataport 810. The communication module 808 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 810 may be any type of connector used for physically interfacing with a smartphone and/or a portable computing device, such as a mini-USB port or an IPHONE®/IPOD® 30-pin connector or LIGHTNING® connector. In other embodiments, the dataport 810 may include multiple communication channels for simultaneous communication with, for example, other processors, servers, and/or client terminals.

The memory 804 may store instructions for communicating with other systems, such as a computer. The memory 804 may store, for example, a program (e.g., computer program code) adapted to direct the processor 802 in accordance with the present embodiments. The instructions also may include program elements, such as an operating system. While execution of sequences of instructions in the program causes the processor 802 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 17:
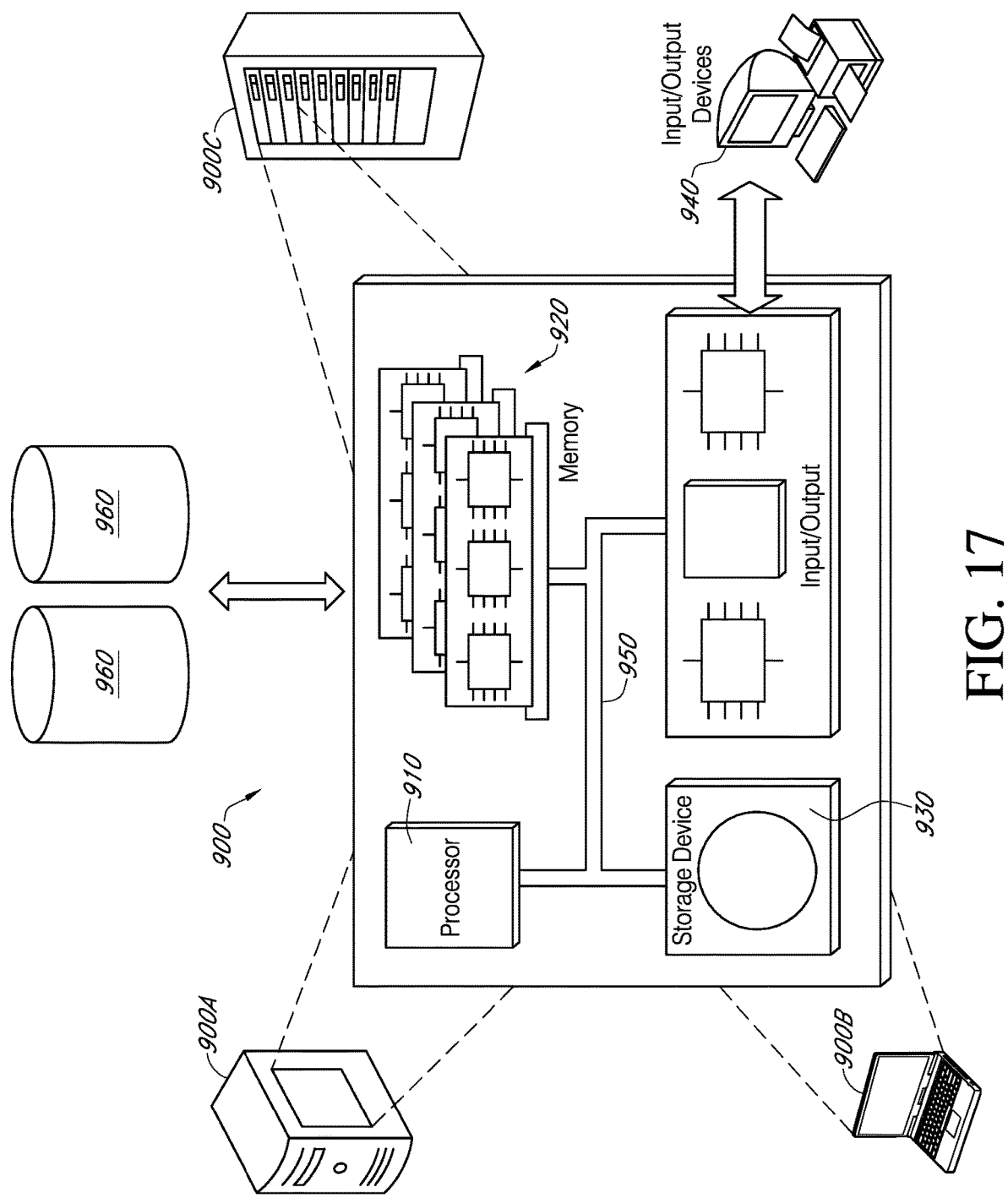
FIG. 17 is a functional block diagram of a general-purpose computing system on which the present embodiments may be implemented according to various aspects of present disclosure.

FIG. 17 is a functional block diagram of a general-purpose computing system on which the present embodiments may be implemented according to various aspects of present disclosure. The computer system 900 may execute at least some of the operations described above. The computer system 900 may be embodied in at least one of a personal computer (also referred to as a desktop computer) 900A, a portable computer (also referred to as a laptop or notebook computer) 900B, and/or a server 900C. A server is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 900 may include at least one processor 910, memory 920, at least one storage device 930, and input/output (I/O) devices 940. Some or all of the components 910, 920, 930, 940 may be interconnected via a system bus 950. The processor 910 may be single- or multi-threaded and may have one or more cores. The processor 910 may execute instructions, such as those stored in the memory 920 and/or in the storage device 930. Information may be received and output using one or more I/O devices 940.

The Memory 920 may store information, and may be a computer-readable medium, such as volatile or non-volatile memory. The storage device(s) 930 may provide storage for the system 900, and may be a computer-readable medium. In various aspects, the storage device(s) 930 may be a flash memory device, a hard disk device, an optical disk device, a tape device, or any other type of storage device.

The I/O devices 940 may provide input/output operations for the system 900. The I/O devices 940 may include a keyboard, a pointing device, and/or a microphone. The I/O devices 940 may further include a display unit for displaying graphical user interfaces, a speaker, and/or a printer. External data may be stored in one or more accessible external databases 960.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s).

What is claimed is:

1. A method for transmitting and storing video images captured by a camera of an audio/video recording and communication device (A/V device), the method comprising:
    capturing, using the camera, video images representing a field of view of the camera;
    detecting a person at the A/V device;
    in response to detecting the person at the A/V device, storing a high-quality version of the video images in a memory of the A/V device, wherein the high-quality version of the video images is stored in the memory independent of an available network bit rate for video streaming;
    determining that the available network bit rate for video streaming is below a threshold;
    based on the determining that the available network bit rate for video streaming is below the threshold, transmitting a low-quality video stream to a client device;
    terminating transmission of the low-quality video stream to the client device; and
    after the transmission of the low-quality video stream is terminated, uploading the high-quality version of the video images from the memory of the A/V device to a remote storage device.

2. The method of claim 1, further comprising, before detecting the person at the A/V device, buffering the video images captured by the camera of the A/V device.

3. The method of claim 1, wherein detecting the person at the A/V device comprises detecting motion within the field of view of the camera.

4. The method of claim 1, wherein the A/V device comprises a doorbell having a button.

5. The method of claim 4, wherein detecting the person at the A/V device comprises detecting that the button has been pressed.

6. The method of claim 1, wherein the A/V device further comprises a microphone.

7. The method of claim 6, further comprising, in response to detecting the person at the A/V device, capturing audio from the person and storing the audio in the memory of the A/V device.

8. The method of claim 7, further comprising uploading the stored audio to the remote storage device.

9. The method of claim 1, wherein the high-quality version of the video images comprises a high framerate, a high bitrate, and/or a high image resolution.

10. An audio/video recording and communication device (A/V device) comprising:
    a camera;
    a processor operatively connected to the camera; and
    a memory storing code that, when executed by the processor, causes the A/V device to:
        detect a person at the A/V device;
        capture, using the camera, video images of the person at the A/V device;
        determine an available network bit rate for video streaming;
        transmit a video stream to a client device, wherein transmission of the video stream comprises:
            if the available network bit rate for video streaming is above a threshold, then transmit a high-quality version of the video images to the client device; and
            if the available network bit rate for video streaming is below the threshold, then transmit a low-quality version of the video images to the client device;

store the high-quality version of the video images in the memory of the A/V device, wherein the high-quality version of the video images is stored in the memory independent of the available network bit rate for video streaming;

terminate transmission of the video stream to the client device; and after the transmission of the video stream is terminated, upload the high-quality version of the video images from the memory of the A/V device to a remote storage device.

11. The A/V device of claim 10, wherein the memory stores further code that, when executed by the processor, further causes the A/V device to, before detecting the person at the A/V device, buffer the video images captured by the camera of the A/V device.

12. The A/V device of claim 10, wherein detecting the person at the A/V device comprises detecting motion within a field of view of the camera.

13. The A/V device of claim 10, wherein the A/V device further comprises a doorbell having a button.

14. The A/V device of claim 13, wherein detecting the person at the A/V device comprises detecting that the button has been pressed.

15. The A/V device of claim 10, wherein the A/V device further comprises a microphone.

16. The A/V device of claim 15, wherein the memory stores further code that, when executed by the processor, further causes the A/V device to, in response to detecting the person at the A/V device, capture audio from the person and store the audio in the memory of the A/V device.

17. The A/V device of claim 16, wherein the memory stores further code that, when executed by the processor, further causes the A/V device to upload the stored audio to the remote storage device.

18. The A/V device of claim 10, wherein the high-quality version of the video images comprises a high framerate, a high bitrate, and/or a high image resolution.

19. A method for transmitting and storing video images captured by a camera of an audio/video recording and communication device (A/V device), the method comprising:

capturing, using the camera, video images representing a field of view of the camera;

detecting a person at the A/V device;

in response to detecting the person at the A/V device, storing a high-quality version of the video images in a memory of the A/V device, wherein the high-quality version of the video images is stored in the memory independent of an available network bit rate for video streaming;

determining that the available network bit rate for video streaming is above a threshold;

based on the determining that the available network bit rate for video streaming is above the threshold, transmitting a high-quality video stream to a client device;

terminating transmission of the high-quality video stream to the client device; and after the transmission of the high-quality video stream is terminated, uploading the high-quality version of the video images from the memory of the A/V device to a remote storage device.

* * * * *